United States Patent
Yoshikawa et al.

(10) Patent No.: US 12,050,418 B2
(45) Date of Patent: Jul. 30, 2024

(54) POWER SUPPLY DEVICE, IMAGE FORMING APPARATUS, AND NON-TRANSITORY RECORDING MEDIUM WITH A SUPERIMPOSED VOLTAGE INCLUDING AN AC VOLTAGE AND A DC VOLTAGE

(71) Applicants: Keita Yoshikawa, Tokyo (JP); Kentaroh Kurosu, Kanagawa (JP); Taichi Urayama, Kanagawa (JP); Suguru Yokozawa, Kanagawa (JP)

(72) Inventors: Keita Yoshikawa, Tokyo (JP); Kentaroh Kurosu, Kanagawa (JP); Taichi Urayama, Kanagawa (JP); Suguru Yokozawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/122,750

(22) Filed: Mar. 17, 2023

(65) Prior Publication Data

US 2023/0305450 A1    Sep. 28, 2023

(30) Foreign Application Priority Data

Mar. 22, 2022  (JP) ................................. 2022-044975
Jan. 10, 2023  (JP) ................................. 2023-001978

(51) Int. Cl.
G03G 15/00    (2006.01)
G03G 15/16    (2006.01)
H02J 4/00     (2006.01)

(52) U.S. Cl.
CPC ......... *G03G 15/1665* (2013.01); *G03G 15/80* (2013.01); *H02J 4/00* (2013.01)

(58) Field of Classification Search
USPC .......................................................... 399/66
See application file for complete search history.

(56) References Cited

U.S. PATENT DOCUMENTS

| | | |
|---|---|---|
| 2013/0223867 A1 | 8/2013 | Nakamura et al. |
| 2017/0299999 A1 | 10/2017 | Yoshikawa |
| 2021/0076487 A1 | 3/2021 | Mitani et al. |
| 2021/0373480 A1* | 12/2021 | Aikawa ............... H03K 7/08 |

FOREIGN PATENT DOCUMENTS

| | | |
|---|---|---|
| JP | 2014-180181 | 9/2014 |
| JP | 2017-191552 | 10/2017 |

* cited by examiner

*Primary Examiner* — Quana Grainger
(74) *Attorney, Agent, or Firm* — XSENSUS LLP

(57) ABSTRACT

A power supply device includes: a DC power supply that generates a DC voltage of a variable value and outputs the DC voltage; an AC power supply that generates an AC voltage of a variable value, and superimposes the AC voltage and the DC voltage to generate a superimposed voltage for output; and a control circuit. The control circuit start giving the DC power supply an instruction to output the DC voltage, and start giving the AC power supply an instruction to output the AC voltage for restricting output of the DC voltage. The control circuit controls an absolute value of the superimposed voltage to be smaller than or equal to a predetermined value in a predetermined period from a time when the giving of the instruction to output the AC voltage is started to a time when the restricting of the output of the DC voltage is started.

13 Claims, 12 Drawing Sheets

FIG. 16

CONTROL METHOD:

| EACH CONTROL | CONTROL METHOD |
|---|---|
| DC TRANSFER CONTROL | PWM_DC CONSTANT CURRENT (−), PWM_DC CONSTANT VOLTAGE (−) (CV CONTROL) |
| AC TRANSFER CONTROL (LOW DUTY AC) FOR UNEVEN PAPER | PWM_AC CONSTANT VOLTAGE, PWM_DC CONSTANT CURRENT (−), PWM_DC CONSTANT VOLTAGE (−) SUPERIMPOSITION METHOD |
| AC TRANSFER CONTROL (HIGH DUTY AC) | PWM_AC CONSTANT CURRENT, PWM_DC CONSTANT CURRENT (−), PWM_DC CONSTANT VOLTAGE (−) SUPERIMPOSITION METHOD |

FIG. 17

| PRECEDING PAPER | INTERVAL | FOLLOWING PAPER |
|---|---|---|
| DC | DC + AC(0V) | DC |
| DC | DC + AC(0V) | HIGH DUTY AC |
| DC | DC + AC(0V) | LOW DUTY AC |
| HIGH DUTY AC | HIGH DUTY AC | DC |
| HIGH DUTY AC | HIGH DUTY AC | HIGH DUTY AC |
| HIGH DUTY AC | DC + AC(0V) | LOW DUTY AC |
| LOW DUTY AC | DC + AC(0V) | DC |
| LOW DUTY AC | DC + AC(0V) | HIGH DUTY AC |
| LOW DUTY AC | DC + AC(0V) | LOW DUTY AC |

FIG. 18

| NON-IMAGE REGION | IMAGE REGION IN LEADING PAPER |
|---|---|
| DC | DC |
| HIGH DUTY AC | HIGH DUTY AC |
| DC + AC(0V) | LOW DUTY AC |

FIG. 19

| PRECEDING PAPER | INTERVAL | FOLLOWING PAPER |
|---|---|---|
| DC | DC + AC(0V) | - |
| HIGH DUTY AC | HIGH DUTY AC → DC + AC (0V) [*1] | - |
| LOW DUTY AC | DC + AC(0V) | - |

POWER SUPPLY DEVICE, IMAGE FORMING APPARATUS, AND NON-TRANSITORY RECORDING MEDIUM WITH A SUPERIMPOSED VOLTAGE INCLUDING AN AC VOLTAGE AND A DC VOLTAGE

CROSS-REFERENCE TO RELATED APPLICATIONS

This patent application is based on and claims priority pursuant to 35 U.S.C. § 119(a) to Japanese Patent Application Nos. 2022-044975, filed on Mar. 22, 2022, and 2023-001978, filed on Jan. 10, 2023, in the Japan Patent Office, the entire disclosure of which is hereby incorporated by reference herein.

BACKGROUND

Technical Field

The present disclosure relates to a power supply device, an image forming apparatus, and a non-transitory recording medium.

Related Art

Electrophotographic image forming apparatuses form an electrostatic latent image on a uniformly charged image bearer, develop the formed electrostatic latent image with toner to form a toner image, transfer the formed toner image onto a recording medium, and fix the toner image on the recording medium to form an image on the recording medium.

When the recording medium has an uneven surface, toner is harder to be transferred to a recess portion than to a protruding portion. However, the use of a superimposed voltage generated by superimposition of an alternating-current (AC) voltage on a direct-current (DC) voltage in transfer can increase the toner transfer rate. In such image forming apparatuses, the superimposed voltage (DC voltage+AC voltage) is applied to an output side of an AC power supply. Thus, in general, the DC voltage is set such that the superimposed voltage does not exceed a withstand voltage of the AC power supply.

Recently, to increase the toner transfer performance onto a recording medium, a technique has been developed which makes an output waveform of an AC voltage to be superimposed on a DC voltage different in accordance with a degree of unevenness of the recording medium rather than switching the DC voltage and the superimposed voltage in accordance with the degree of unevenness of the recording medium in the image forming apparatuses described above.

SUMMARY

According to an embodiment of the present disclosure, a power supply device includes a DC power supply, an AC power supply, and a control circuit. The DC power supply generates a DC voltage of a variable value and outputs the DC voltage. The AC power supply generates an AC voltage of a variable value, superimposes the AC voltage and the DC voltage output from the DC power supply to generate a superimposed voltage, and outputs the superimposed voltage. The control circuit controls the AC power supply and the DC power supply. The control circuit starts giving the DC power supply an instruction to output the DC voltage, and starts giving the AC power supply an instruction to output the AC voltage. The DC power supply restricts output of the DC voltage in accordance with the AC voltage generated by the AC power supply. The control circuit controls an absolute value of the superimposed voltage to be smaller than or equal to a predetermined value in a predetermined period from a time when the giving of the instruction to output the AC voltage is started to a time when the restricting of the output of the DC voltage is started.

According to an embodiment of the present disclosure, an image forming apparatus includes the power supply device described above, and a transfer device. The transfer device transfers an image onto a recording medium in accordance with the superimposed voltage output from the AC power supply.

According to an embodiment of the present disclosure, a non-transitory recording medium stores a plurality of instructions which, when executed by a processor on a power supply device, causes the processor to perform a control sequence. The power supply device includes a DC power supply and an AC power supply. The DC power supply generates a DC voltage of a variable value and outputs the DC voltage. The AC power supply generates an AC voltage of a variable value, superimposes the AC voltage and the DC voltage output from the DC power supply to generate a superimposed voltage, and outputs the superimposed voltage. The control sequence includes starting giving the DC power supply an instruction to output the DC voltage, starting giving the AC power supply an instruction to output the AC voltage, and restricting output of the DC voltage at the DC power supply in accordance with the AC voltage generated by the AC power supply. An absolute value of the superimposed voltage is controlled to be smaller than or equal to a predetermined value in a predetermined period from a time when the giving of the instruction to output the AC voltage is started to a time when the restricting of the output of the DC voltage is started.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 16 is a table for describing an example of transfer bias switching control performed by a printing apparatus according to a third embodiment during continuous printing;

FIG. 17 is a table for describing an example of transfer bias switching control performed by the printing apparatus according to the third embodiment in an interval between papers when information on following paper is acquirable;

FIG. 18 is a table for describing an example of switching of a transfer bias performed by the printing apparatus according to the third embodiment; and FIG. 19 is a table for describing an example of settings of the transfer bias in the printing apparatus according to the third embodiment.

Figure 1:
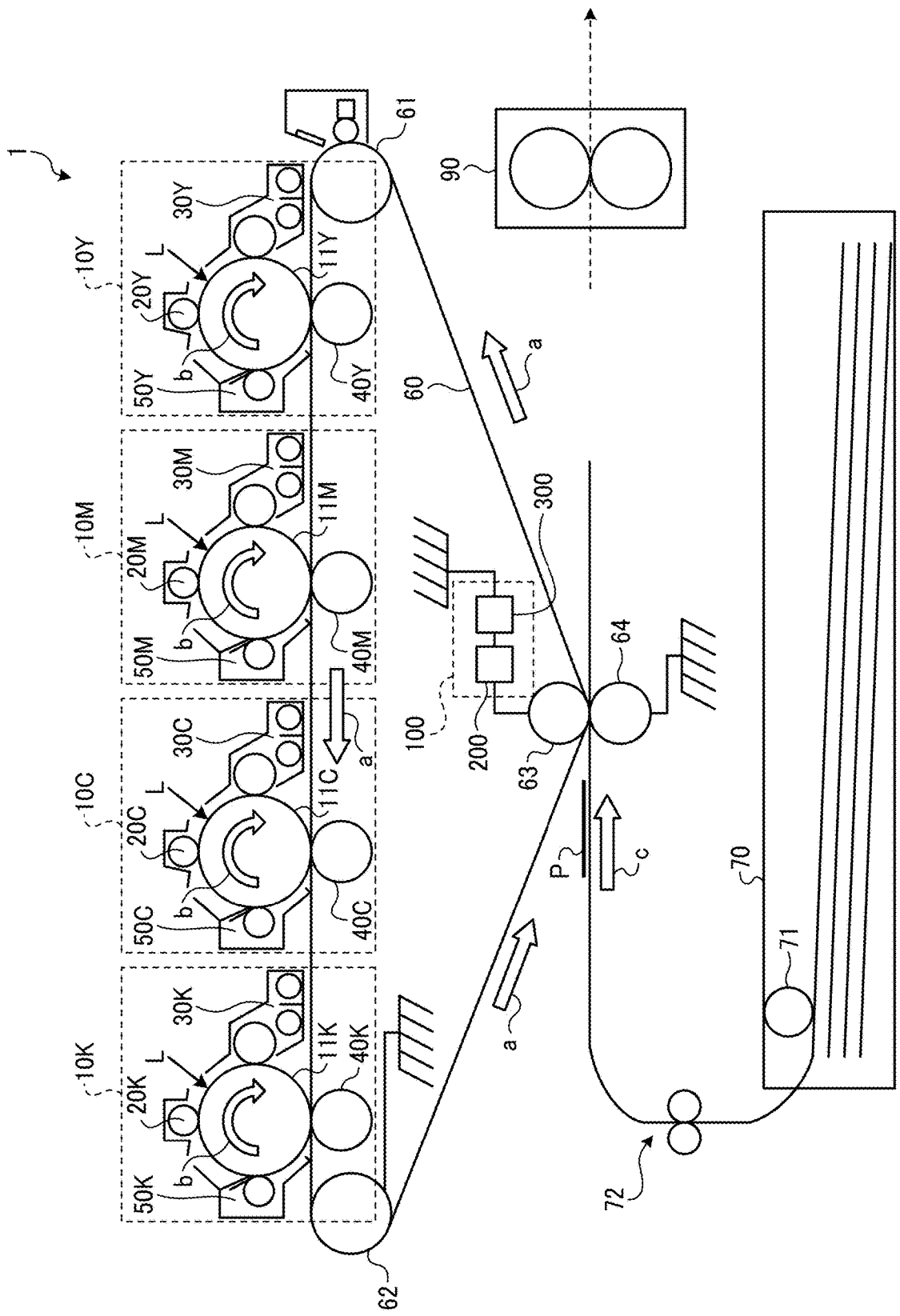
FIG. 1 is a mechanical configuration diagram illustrating an example of a printing apparatus according to a first embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A power supply device, an image forming apparatus, an output control method, and a non-transitory recording medium according to embodiments of the present disclosure will be described in detail below with reference to the accompanying drawings. In the embodiments below, for example, the image forming apparatus according to the embodiments of the present disclosure will be described which is applied to, but not limited to, an electrophotographic color printing apparatus, specifically, a printing apparatus that superimposes color component images of four colors. i.e., yellow (Y), magenta (M), cyan (C), and black (K) together on a recording medium to form an image on the recording medium.

The image forming apparatus according to the embodiments of the present disclosure may be applied to any electrophotographic color or monochrome image forming apparatus, for example, an electrophotographic copier or an electrophotographic multifunction peripheral (MFP). The MFP is an apparatus having at least two functions among a print function, a copy function, a scanner function, and a facsimile function.

First Embodiment

FIG. 1 is a mechanical configuration diagram illustrating an example of a printing apparatus 1 according to a first embodiment. As illustrated in FIG. 1, the printing apparatus 1 includes image forming units 10Y, 10M, 10C, and 10K, an intermediate transfer belt 60, support rollers 61 and 62, a secondary-transfer-unit opposing roller (repulsion roller) 63, a secondary transfer roller 64, a sheet cassette 70, a sheet feeding roller 71, a transport roller pair 72, a fixing device 90, and a secondary transfer power supply 200. The secondary-transfer-unit opposing roller 63 is an example of a transfer device.

As illustrated in FIG. 1, the image forming units 10Y, 10M, 10C, and 10K are arranged along the intermediate transfer belt 60 in an order of the image forming units 10Y, 10M, 10C, and 10K from an upstream side in a moving direction (direction of an arrow a) of the intermediate transfer belt 60.

Figure 2:
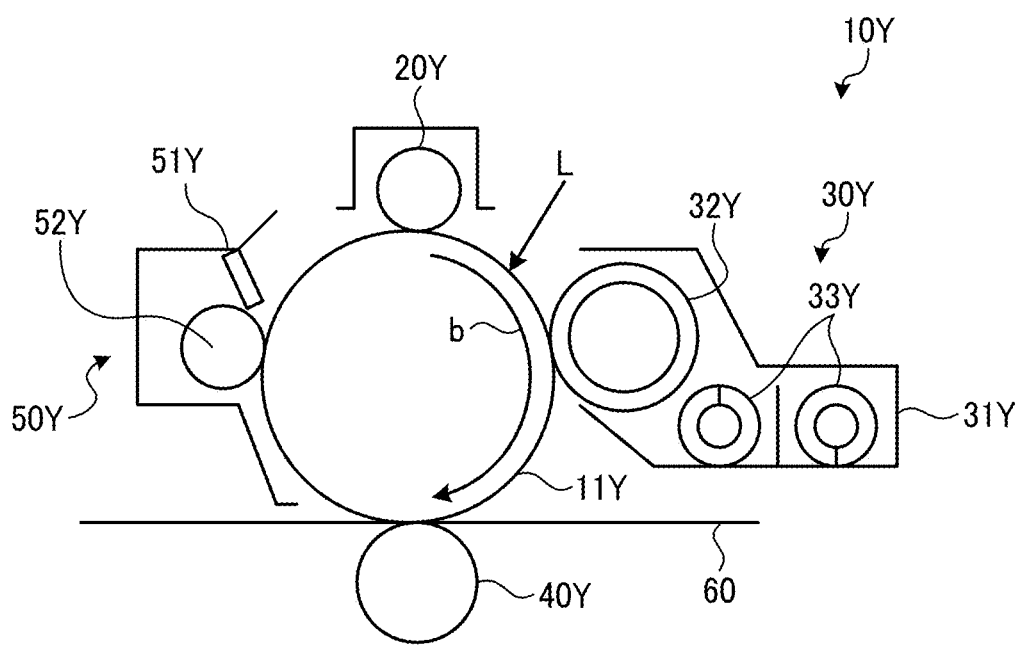
FIG. 2 is a mechanical configuration diagram illustrating an example of an image forming unit according to the first embodiment.

FIG. 2 is a mechanical configuration diagram illustrating an example of the image forming unit 10Y according to the present embodiment. As illustrated in FIG. 2, the image forming unit 10Y includes a photoconductor drum 11Y, a charging device 20Y, a developing device 30Y, a primary transfer roller 40Y, and a cleaning device 50Y. The image forming unit 10Y performs an image forming process (including charging, irradiating, developing, transferring, and cleaning steps) on the photoconductor drum 11Y to form a yellow toner image (color component image) on the photoconductor drum 11Y and transfer the yellow toner image onto the intermediate transfer belt 60.

Note that all the image forming units 10M, 10C, and 10K include components common to the components of the image forming unit 10Y. The image forming unit 10M performs an image forming process to form a magenta toner image. The image forming unit 10C performs an image forming process to form a cyan toner image. The image forming unit 10K performs an image forming process to perform a black toner image. Thus, the components of the image forming unit 10Y will be mainly described below. The components of the image forming units 10M, 10C, and 10K are respectively denoted by the reference signs with M, C, and K (see FIG. 1) instead of Y attached to the reference signs for the components of the image forming unit 10Y, and the description of the image forming units 10M, 10C, and 10K is omitted.

The photoconductor drum 11Y is an image bearer and is driven to rotate in a direction of an arrow b. The photoconductor drum 11Y is, for example, an organic photoconductor having an outer diameter of 60 mm. Photoconductor drums 11M, 11C, and 11K are similarly driven to rotate in the direction of the arrow b.

Note that the photoconductor drum 11K for black may be driven to rotate independently from the photoconductor drums 11Y, 11M, and 11C for colors. This allows the photoconductor drum 11K for black alone to be driven to rotate when a monochrome image is formed, and allows the photoconductor drums 11Y, 11M, 11C, and 11K to be simultaneously driven to rotate when a color image is formed.

First, in the charging step, the charging device 20Y charges the surface of the photoconductor drum 11Y that is driven to rotate. Specifically, the charging device 20Y applies a superimposed voltage generated by superimposing an AC voltage on a DC voltage, to a charge roller that is a conductive elastic body having a roller shape, for example. Consequently, the charging device 20Y causes direct discharge between the charge roller and the photoconductor drum 11Y to charge the photoconductor drum 11Y to have a predetermined polarity, for example, a negative polarity.

Subsequently, in the irradiating step, an irradiation device irradiates the charged surface of the photoconductor drum 11Y with optically modulated laser light L to form an electrostatic latent image on the surface of the photoconductor drum 11Y. As a result, an absolute value of a potential in a portion of the surface of the photoconductor drum 11Y that is irradiated with the laser light L decreases, and this portion serves as the electrostatic latent image (image region). An absolute value of a potential in the other region of the surface of the photoconductor drum 11Y that is not irradiated with the laser light L is maintained high, and the other portion serves as a background.

Subsequently, in the developing step, the developing device 30Y develops the electrostatic latent image formed on the photoconductor drum 11Y with yellow toner to form a yellow toner image on the photoconductor drum 11Y.

The developing device 30Y includes a container 31Y, a developing sleeve 32Y accommodated in the container 31Y, and screw members 33Y accommodated in the container 31Y. The container 31Y stores a two-component developer including yellow toner and a carrier. The developing sleeve 32Y is a developer bearer and is arranged to oppose the photoconductor drum 11Y through an opening of the container 31Y. The screw members 33Y are stirring members that transport the developer while stirring the developer. The screw members 33Y are respectively arranged on a developer supply side which is a developing sleeve side and a toner reception side where toner is supplied from a toner supply device, and are supported by respective bearings to be rotatable in the container 31Y.

Subsequently, in the transferring step, the primary transfer roller 40Y transfers the yellow toner image formed on the photoconductor drum 11Y onto the intermediate transfer belt 60. After the toner image is transferred, some toner remains untransferred on the photoconductor drum 11Y.

The primary transfer roller 40Y is an elastic roller having a conductive sponge layer, for example, and is arranged to be pressed against the photoconductor drum 11Y from the back surface of the intermediate transfer belt 60. Note that a bias subjected to constant current control is applied as a primary transfer bias to the elastic roller, i.e., the primary transfer roller 40Y. The primary transfer roller 40Y has, for example, an external diameter of 16 mm and a core diameter of 10 mm. The sponge layer of the primary transfer roller 40Y has a resistance R of about $3E7\Omega$. Note that the resistance R of the sponge layer is a value calculated using the Ohm's law (R=V/I) from a current I that flows when a voltage V of 1000 V is applied to the core of the primary transfer roller 40Y with a grounded metal roller having an external diameter of 30 mm being pressed against the sponge layer by 10 N.

Subsequently, in the cleaning step, the cleaning device 50Y cleans the toner that remains untransferred on the photoconductor drum 11Y. The cleaning device 50Y includes a cleaning blade 51Y and a cleaning brush 52Y. The cleaning blade 51Y cleans the surface of the photoconductor drum 11Y while abutting the photoconductor drum 11Y in a counter direction relative to a rotation direction of the photoconductor drum 11Y. The cleaning brush 52Y cleans the surface of the photoconductor drum 11Y in contact with the photoconductor drum 11Y while rotating in a direction opposite to the rotation direction of the photoconductor drum 11Y.

Referring back to FIG. 1, the intermediate transfer belt 60 is an endless belt stretched around a plurality of rollers such as the support rollers 61 and 62 and the secondary-transfer-unit opposing roller 63. The intermediate transfer belt 60 endlessly moves in the direction of the arrow a as a result of one of the support rollers 61 and 62 being driven to rotate. Onto the intermediate transfer belt 60, the yellow toner image is transferred first by the image forming unit 10Y, subsequently the magenta toner image is transferred by the image forming unit 10M, subsequently the cyan toner image is transferred by the image forming unit 10C, and subsequently the black toner image is transferred by the image forming unit 10K sequentially in a superimposed manner. Consequently, a full-color toner image (full-color image) is formed on the intermediate transfer belt 60. The intermediate transfer belt 60 subsequently transports the formed full-color toner image to a position between the secondary-transfer-unit opposing roller 63 and the secondary transfer roller 64.

The intermediate transfer belt 60 is made of, for example, an endlessly shaped carbon-dispersed polyimide resin having a thickness of 20 to 200 μm (preferably about 60 μm), a volume resistivity of 6.0 to 13.0 LogΩcm (preferably 7.5 to 12.5 LogΩcm, more preferably about 9 LogΩcm), and a surface resistivity of 9.0 to 13.0 LogΩcm (preferably, 10.0 to 12.0 LogΩcm). The volume resistivity is a resistance value measured using the Hiresta HRS probe manufactured by Mitsubishi Chemical Corporation at 100 V for 10 sec. The surface resistivity is a resistance value measured using the Hiresta HRS probe manufactured by Mitsubishi Chemical Corporation at 500 V for 10 sec. The support roller 62 is grounded.

A plurality of recording media are accommodated in a stacked manner in each tray of the sheet cassette 70. Different kinds or sizes of recording media are accommodated in different trays. In the present embodiment, for example, the recording media are, but not limited to, normal paper and leather-like paper having large unevenness. In another example, the recording media may be overhead projector (OHP) sheets, films, or the like.

The sheet feeding roller 71 abuts on a topmost recording medium P in the tray of the sheet cassette 70 and feeds the abutting recording medium P.

The transport roller pair 72 transports the recording medium P fed by the sheet feeding roller 71 to a position between the secondary-transfer-unit opposing roller 63 and the secondary transfer roller 64 (in a direction of an arrow c) at a predetermined timing.

The secondary-transfer-unit opposing roller 63 and the secondary transfer roller 64 collectively transfers the full-color toner image transported by the intermediate transfer belt 60 onto the recording medium P transported by the transport roller pair 72 at a secondary transfer nip between the secondary-transfer-unit opposing roller 63 and the secondary transfer roller 64.

The secondary-transfer-unit opposing roller 63 has, for example, an external diameter of 24 mm, a core diameter of 16 mm, and a conductive nitrile-butadiene-rubber-based (NBR-based) rubber layer. Note that the conductive NBR-based rubber layer preferably has a resistance R of 6.0 to 12.0 LogΩ (or SUS), preferably, 4.0 LogΩ. The secondary transfer roller 64 has, for example, an external diameter of 24 mm, a core diameter of 14 mm, and a conductive NBR-based rubber layer. Note that the conductive NBR-based rubber layer preferably has a resistance R of 6.0 to 8.0 LogΩ, preferably, 7.0 to 8.0 LogΩ. The volume resistance of the secondary transfer roller 64 is a measured resistance value obtained in rotation measurement. Specifically, resistances of one rotation of the secondary transfer roller 64 are measured in 1-minute measurement in which a weight of 5 N is applied per side and a bias of 1 kV is applied to the shaft of the secondary transfer roller 64, and an average value of the resistances is used as the volume resistance.

The secondary transfer power supply 200 for a transfer bias, which is included in a power supply device 100, is coupled to the secondary-transfer-unit opposing roller 63. The power supply device 100 includes a power supply control unit 300 that controls the secondary transfer power supply 200. The secondary transfer power supply 200 applies a voltage to the secondary-transfer-unit opposing roller 63 to transfer the full-color toner image onto the recording medium P at the secondary transfer nip. Specifically, the secondary transfer power supply 200 applies a superimposed voltage (hereinafter, sometimes referred to as a "superimposed bias") in which a DC voltage and an AC voltage are superimposed, to the secondary-transfer-unit opposing roller 63. This causes a potential difference between the secondary-transfer-unit opposing roller 63 and the secondary transfer roller 64 and generates a voltage that makes the toner to move toward the recording medium P from the intermediate transfer belt 60. Thus, the full-color toner image is successfully transferred onto the recording medium P. In the present embodiment, the potential difference is equal to (the potential at the secondary-transfer-unit opposing roller 63)−(the potential at the secondary transfer roller 64).

The fixing device 90 applies heat and pressure onto the recording medium P having the full-color toner image transferred thereon to fix the full-color toner image on the recording medium P. The recording medium P having the full-color toner image fixed thereon is ejected to outside of the printing apparatus 1.

Figure 3:
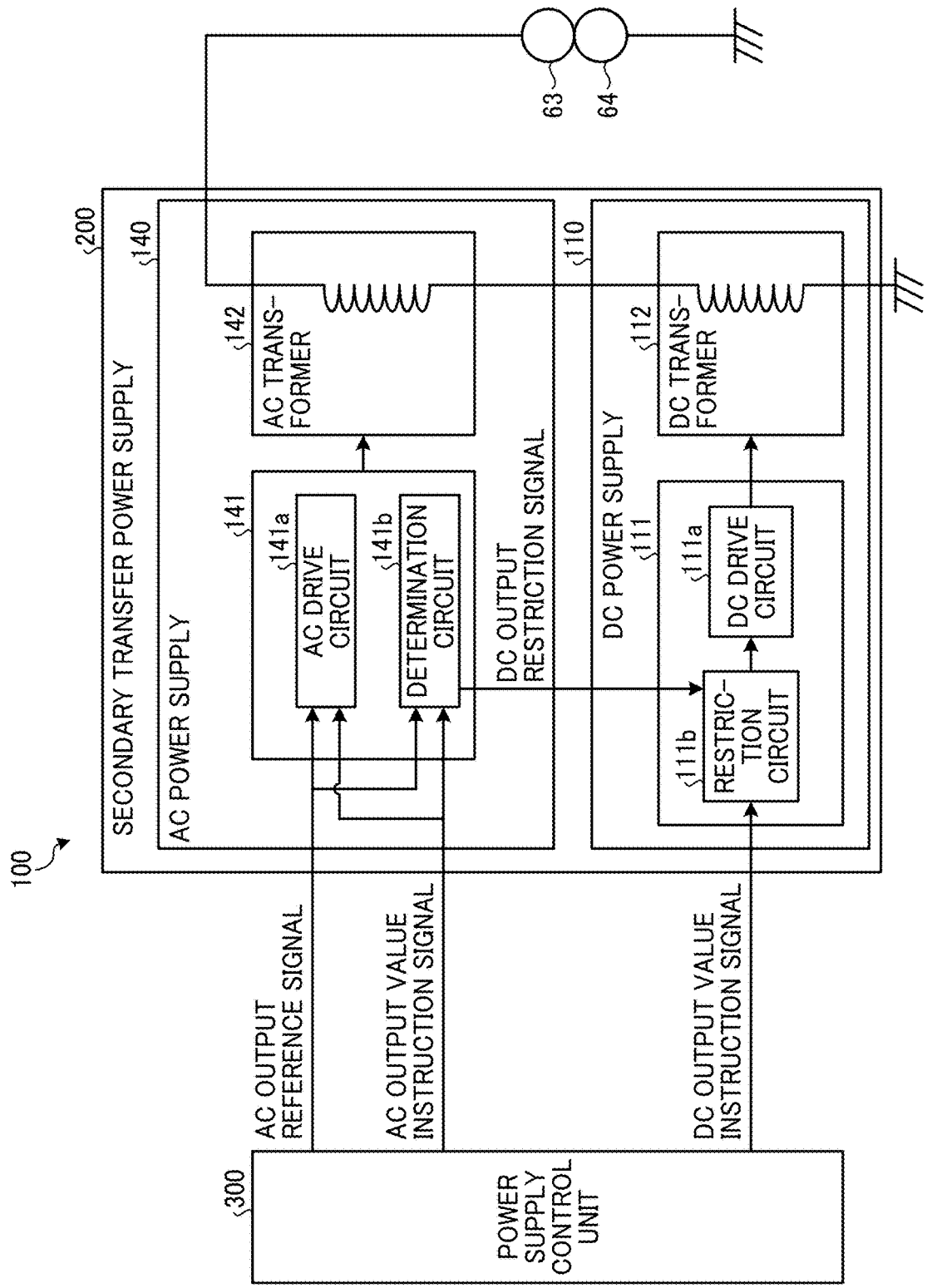
FIG. 3 is a block diagram illustrating an example of an electrical configuration of a power supply device of the printing apparatus according to the first embodiment.

FIG. 3 is a block diagram illustrating an example of an electrical configuration of the power supply device 100 of the printing apparatus 1 according to the present embodiment. As illustrated in FIG. 3, the printing apparatus 1 includes the power supply device 100 that is an example of a power supply device. The power supply device 100 includes the secondary transfer power supply 200 and the power supply control unit 300. The secondary transfer power supply 200 includes a DC power supply 110 and an AC power supply 140. The DC power supply 110 and the AC power supply 140 are connected in series.

The DC power supply 110 is a power supply for transferring toner, and outputs a DC voltage to the AC power supply 140. In the present embodiment, the DC power supply 110 outputs a DC voltage, based on a DC output value according to an AC voltage generated by the AC power supply 140 in accordance with a first restriction function (described later). Specifically, the DC output value is defined based on an output waveform of the AC voltage. In the present embodiment, an example case will be described where the DC voltage output by the DC power supply 110 is, but not limited to, a negative-polarity DC voltage.

The DC power supply 110 includes a DC drive unit 111 and a DC transformer 112. The DC drive unit 111 includes a DC drive circuit 111*a* and a restriction circuit 111*b*. Examples of the DC drive circuit 111*a* include a drive circuit that drives the DC transformer 112.

The AC power supply 140 is a power supply for vibrating toner. The AC power supply 140 generates an AC voltage, superimposes the generated AC voltage and the DC voltage output from the DC power supply 110 to generate a superimposed voltage, and outputs the superimposed voltage to the secondary-transfer-unit opposing roller 63 which is a load. In the present embodiment, in a control sequence in which the power supply control unit 300 starts giving the DC power supply 110 an instruction to output a DC voltage and subsequently starts giving the AC power supply 140 an instruction to output an AC voltage, the AC power supply 140 generates the AC voltage in accordance with a second restriction function (described later) such that an absolute value of the superimposed voltage is smaller than or equal to a predetermined value in a predetermined period.

The AC power supply 140 includes an AC drive unit 141 and an AC transformer 142. The AC drive unit 141 includes an AC drive circuit 141*a* and a determination circuit 141*b*. Examples of the AC drive circuit 141*a* include a drive circuit that drives the AC transformer 142.

The power supply control unit 300 controls the secondary transfer power supply 200. In the present embodiment, in the control sequence in which the power supply control unit 300 starts giving the DC power supply 110 an instruction to output a DC voltage and subsequently starts giving the AC power supply 140 an instruction to output an AC voltage, the power supply control unit 300 controls the AC power supply 140 in accordance with the second restriction function (described later) such that the absolute value of the superimposed voltage is smaller than or equal to the predetermined value in the predetermined period.

Figure 4:
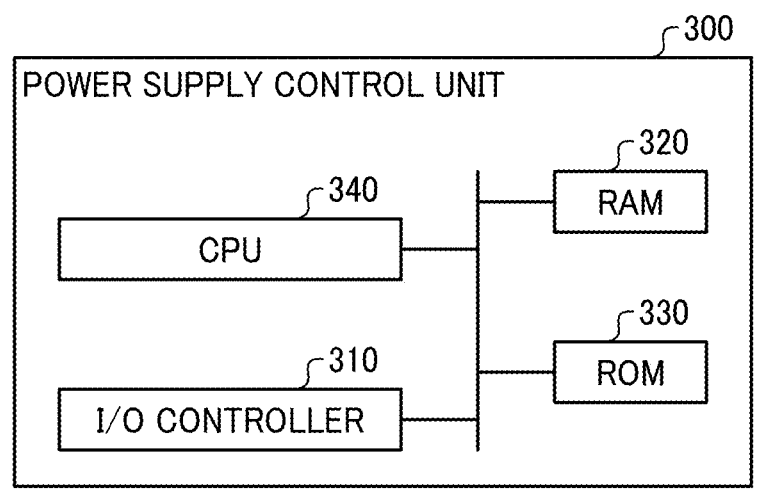
FIG. 4 is a block diagram illustrating an example of a configuration of a power supply control unit according to the first embodiment.

FIG. 4 is a block diagram illustrating an example of a configuration of the power supply control unit 300 according to the present embodiment. As illustrated in FIG. 4, the power supply control unit 300 includes an input/output (I/O) controller 310, a random access memory (RAM) 320, a read-only memory (ROM) 330, and a central processing unit (CPU) 340.

The I/O controller 310 controls input and output of various signals, and controls input and output of signals exchanged between the power supply control unit 300 and the secondary transfer power supply 200.

The RAM 320 is a volatile storage device (memory) and is used as a work area of the CPU 340 or the like.

The ROM 330 is a nonvolatile read-only storage device (memory) and stores various programs executed in power supply control, data used in various kinds of processing performed in power supply control, and so on. Note that the ROM 330 may be implemented by a flash memory to enable writing.

The CPU 340 receives a user setting for a high voltage output from an operation panel or the like, and causes, via the I/O controller 310, the secondary transfer power supply 200 to output a high voltage according to the received user setting. In the present embodiment, an example case will be described where the user setting for a high voltage output is, but not limited to, a setting as to whether the output waveform of the AC voltage used in the superimposed bias is a high-duty output waveform or a low-duty output waveform. In the present embodiment, the CPU 340 uses a storage area of the RAM 320 or the like as the work area to execute the programs stored in the ROM 330. In this manner, the CPU 340 controls the high voltage output performed by the secondary transfer power supply 200.

Specifically, the high-duty output waveform is an output waveform whose duty ratio is greater than or equal to a threshold value, whereas the low-duty output waveform is an output waveform whose duty ratio is less than the threshold value. In the present embodiment, an example case will be described where the threshold value, the high-duty output waveform, and the low-duty output waveform are, but not limited to, 50%, an output waveform having a duty ratio of 80%, and an output waveform having a duty ratio of 20%, respectively.

In the present embodiment, an example case will be described where, when an image is transferred onto a recording medium having a large degree of unevenness such as Japanese paper, the low-duty output waveform is set as the user setting for the high voltage output, and when an image is transferred onto a recording medium having a small degree of unevenness such as normal paper, the high-duty output waveform is set as the user setting for the high voltage output. However, the configuration is not limited to this example case.

Superimposed Voltage Restriction Function

A superimposed voltage restriction function of the printing apparatus 1 according to the present embodiment will be described next. The superimposed voltage restriction function is a function for restricting the DC voltage output by the DC power supply 110 and the AC voltage generated by the AC power supply 140 such that the superimposed voltage (superimposed bias) does not exceed a withstand voltage of the AC transformer 142.

Hereinafter, a function of restricting the DC voltage output by the DC power supply 110 is referred to as the first restriction function, and a function of restricting the AC voltage generated by the AC power supply 140 is referred to as the second restriction function. An example case will be described where the secondary transfer power supply 200 (the DC power supply 110 and the AC power supply 140) performs constant voltage control. However, the control is not limited to the constant voltage control, and the secondary transfer power supply 200 (the DC power supply 110 and the AC power supply 140) may perform constant current control. In addition, an example case will be described where an absolute value of a withstand voltage of the AC transformer 142 of the AC power supply 140 on an output side (at an output terminal) is 15 kV. However, the withstand voltage is not limited to this voltage.

First Restriction Function

The first restriction function will be described first.

Figure 5:
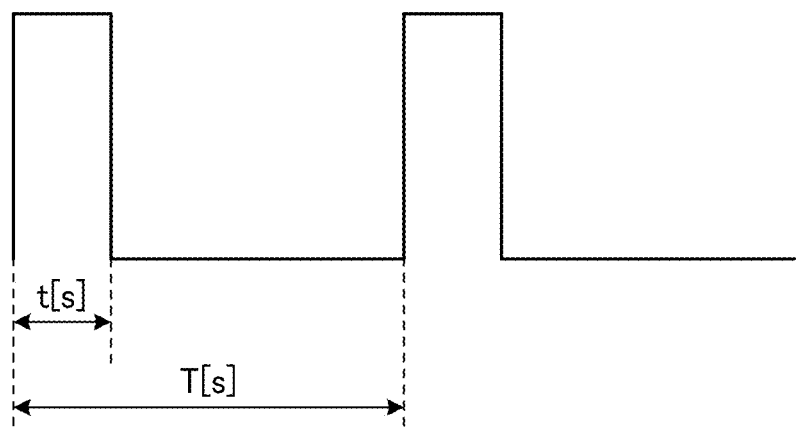
FIG. 5 is a diagram illustrating an example of an AC output reference signal according to the first embodiment.

The power supply control unit 300 outputs an AC output reference signal to the AC power supply 140. The AC output reference signal is a signal for specifying the output waveform of the AC voltage. In the present embodiment, the AC output reference signal is, but not limited to, a pulse width modulation (PWM) signal as illustrated in FIG. 5, for example. In the example illustrated in FIG. 5, the duty ratio Duty is equal to (t/T)×100, where T denotes a period (1/T denotes a frequency) and t denotes a pulse width.

Note that the period T and the pulse width t of the AC output reference signal respectively serve as a period and a pulse width of the AC voltage generated by the AC power supply 140 (the superimposed voltage output by the AC power supply 140). Thus, the duty ratio Duty of the AC output reference signal denotes a duty ratio of the AC voltage generated by the AC power supply 140.

As described above, in the present embodiment, the high-duty output waveform is the output waveform having the duty ratio of 80%, and the low-duty output waveform is the output waveform having the duty ratio of 20%. Thus, when the high-duty output waveform is set as the user setting for the high voltage output, the power supply control unit 300 sets, for example, the period T to 2.0 ms and the pulse width t to 1.6 ms, and outputs to, the AC power supply 140, the AC output reference signal having the duty ratio Duty set to 80%. When the low-duty output waveform is set as the user setting for the high voltage output, the power supply control unit 300 sets, for example, the period T to 2.0 ms and the pulse width t to 0.4 ms, and outputs, to the AC power supply 140, the AC output reference signal having the duty ratio Duty set to 20%.

In response to receiving the AC output reference signal from the power supply control unit 300, the AC drive unit 141 outputs, to the DC power supply 110, a restriction signal according to the duty ratio of the output waveform of the AC voltage generated based on the received AC output reference signal by the AC power supply 140 from among a plurality of restriction signals. Specifically, the AC drive unit 141 includes the determination circuit 141*b*. The determination circuit 141*b* determines whether the duty ratio of the output waveform of the AC voltage generated based on the received AC output reference signal by the AC power supply 140 is greater than or equal to a threshold value. If the duty ratio is greater than or equal to the threshold value, the determination circuit 141*b* outputs a first restriction signal to the DC power supply 110. If the duty ratio is lower than the threshold value, the determination circuit 141*b* outputs a second restriction signal to the DC power supply 110. The first restriction signal and the second restriction signal may be a binary DC output restriction signal simply indicating high or low. For example, the determination circuit 141*b* may output the high DC output restriction signal as the first restriction signal and may output the low DC output restriction signal as the second restriction signal.

In the present embodiment, the AC drive unit 141 determines whether the duty ratio of the received AC output reference signal is greater than or equal to 50%. If the duty ratio is greater than or equal to 50%, the AC drive unit 141 outputs the first restriction signal to the DC power supply 110. If the duty ratio is lower than 50%, the AC drive unit 141 outputs the second restriction signal to the DC power supply 110.

Note that in the present embodiment, the first restriction signal and the second restriction signal are, but not limited to, a signal indicating that output of the DC voltage is to be restricted and a signal indicating that output of the DC voltage is not to be restricted, respectively.

In the present embodiment, an example case will be described where each of the first restriction signal and the second restriction signal is a signal that is switchable between active and inactive. However, the first restriction signal and the second restriction signal are not limited to these signals and may be any signals. In the present embodiment, outputting the first restriction signal is, but not limited to, making the first restriction signal active, and outputting the second restriction signal is, but not limited to, making the second restriction signal active.

The power supply control unit 300 outputs a DC output value instruction signal to the DC power supply 110. The DC output value instruction signal is, but not limited to, a signal indicating a second DC output value for controlling a voltage value of the DC voltage output by the DC power supply 110. In the present embodiment, the DC output value instruction signal that is, but not limited to, a PWM signal will be described as an example.

Figure 6:
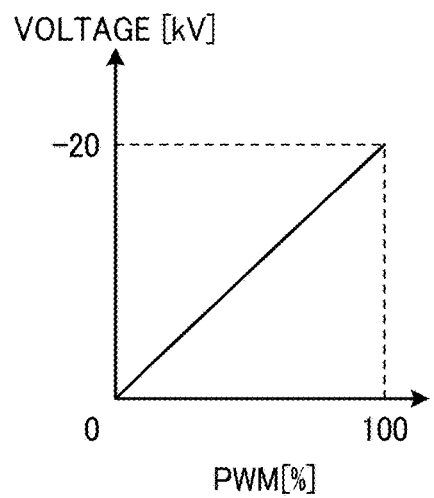
FIG. 6 is a graph illustrating an example of a DC output value instruction signal according to the first embodiment.

As described before, in the present embodiment, the DC power supply 110 performs constant voltage control. Thus, the second DC output value indicates the voltage value of the DC voltage. In the present embodiment, the duty ratio of the DC output value instruction signal indicates the voltage value of the DC voltage that is the second DC output value as illustrated in FIG. 6. In the present embodiment, an example case will be described where the duty ratio of the DC output value instruction signal is 50% and the second DC output value is −10 kV. However, the configuration is not limited to this example case.

When the DC power supply 110 performs constant current control, the second DC output value indicates a current value of the DC current output from the DC power supply 110 in response to output of the DC voltage. In this case, the DC power supply 110 controls the voltage value of the DC voltage to make the current value of the output DC current equal to the second DC output value.

Based on the DC output value corresponding to the restriction signal received from the AC power supply 140, the DC drive unit 111 causes the DC transformer 112 to output a DC voltage (causes the DC transformer 112 to generate a DC voltage). Specifically, in response to receiving the first restriction signal from the AC power supply 140, the DC drive unit 111 causes the DC transformer 112 to output a DC voltage (causes the DC transformer 112 to generate a DC voltage) based on the first DC output value. In response to receiving the second restriction signal from the AC power supply 140, the DC drive unit 111 causes the DC transformer 112 to output a DC voltage (causes the DC transformer 112 to generate a DC voltage) based on the second DC output value.

The first DC output value is a value for controlling the voltage value of the DC voltage output by the DC power supply 110. As described above, since the DC power supply 110 performs constant voltage control, the first DC output value also indicates the voltage value of the DC voltage. The absolute value of the first DC output value is smaller than the absolute value of the second DC output value. In the present embodiment, an example case will be described where the first DC output value is, but no limited to, −5 kV.

Specifically, in response to receiving the DC output value instruction signal while receiving the second restriction signal, the restriction circuit 111b of the DC drive unit 111 outputs, to the DC drive circuit 111a, a signal instructing the second DC output value rather than the value of the DC output value instruction signal. In response to receiving the DC output value instruction signal while receiving the first restriction signal, the restriction circuit 111b outputs, to the DC drive circuit 111a, the value of the DC output value instruction signal. If the restriction circuit 111b does not receive the DC output value instruction signal, the restriction circuit 111b outputs neither the signal indicating the second DC output value nor the DC output value instruction signal. In response to receiving the DC output value instruction signal from the power supply control unit 300, the DC drive circuit 111a of the DC drive unit 111 causes the DC transformer 112 to output the DC voltage based on the second DC output value indicated by the DC output value instruction signal if the second restriction signal is received from the AC power supply 140.

Figure 7:
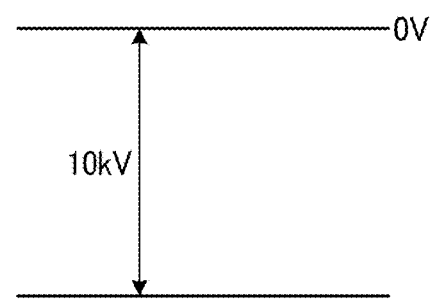
FIG. 7 is a diagram illustrating an example of a DC voltage according to the first embodiment.

In the present embodiment, in response to receiving the DC output value instruction signal from the power supply control unit 300 while receiving the second restriction signal from the AC power supply 140, the DC drive unit 111 drives the DC transformer 112 such that the voltage value of the DC voltage generated by the DC transformer 112 becomes equal to −10 kV which is the second DC output value. Consequently, the DC transformer 112 outputs a negative-polarity DC high voltage (DC bias) of −10 kV as illustrated in FIG. 7.

On the other hand, in response to receiving the DC output value instruction signal from the power supply control unit 300 while receiving the first restriction signal from the AC power supply 140, the DC drive unit 111 causes the DC transformer 112 to output the DC voltage based on the second DC output value indicated by the DC output value instruction signal by restricting the DC voltage to the DC voltage based on the first DC output value.

In the present embodiment, in response to receiving the DC output value instruction signal from the power supply control unit 300 while receiving the first restriction signal from the AC power supply 140, the DC drive unit 111 drives the DC transformer 112 such that the voltage value of the DC voltage generated by the DC transformer 112 becomes equal to −5 kV which is the first DC output value, rather than −10 kV which is the second DC output value. Consequently, the DC transformer 112 outputs a negative-polarity DC high voltage (DC bias) limited to −5 kV instead of −10 kV.

The power supply control unit 300 outputs an AC output value instruction signal to the AC power supply 140. The AC output value instruction signal is a signal indicating an AC output value for controlling a voltage value of the AC voltage output by the AC power supply 140. In the present embodiment, the AC output value instruction signal that is, but not limited to, a PWM signal will be described as an example.

Figure 8:
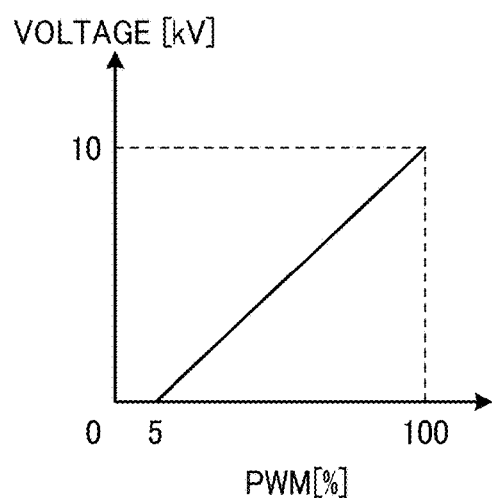
FIG. 8 is a graph illustrating an example of an AC output value instruction signal according to the first embodiment.

As described before, in the present embodiment, the AC power supply 140 performs constant voltage control. Thus, the AC output value indicates a potential difference between peaks of the AC voltage (difference between the largest voltage value and the smallest voltage value). In the present embodiment, as illustrated in FIG. 8, the duty ratio of the AC output value instruction signal indicates a potential difference of the AC voltage that is the AC output value. In the present embodiment, an example case will be described where the duty ratio of the AC output value instruction signal is 100% and the AC output value is 10 kV. However, the configuration is not limited to this example case.

When the AC power supply 140 performs constant current control, the AC output value indicates a current value of the AC current output from the AC power supply 140 in response to output of the AC voltage. In this case, the AC power supply 140 controls the voltage value of the AC voltage to make the current value of the output AC current equal to the AC output value.

In response to receiving the AC output value instruction signal in addition to the AC output reference signal from the power supply control unit 300, the AC drive unit 141 causes the AC transformer 142 to generate an AC voltage based on the AC output reference signal and the AC output value indicated by the AC output value instruction signal and to output a superimposed voltage in which the generated AC voltage and the DC voltage output from the DC power supply 110 are superimposed.

Figure 9:
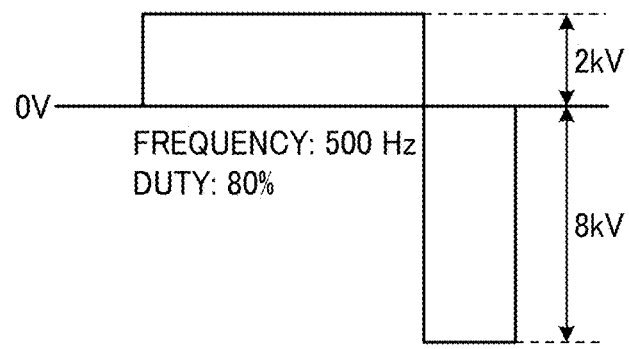
FIG. 9 is a diagram illustrating an example of an AC voltage according to the first embodiment.

For example, the AC output reference signal is a signal that has the period T of 2.0 ms and the pulse width t of 1.6 ms and thus has the duty ratio Duty set to 80%, and the AC output value instruction signal is a signal that has the duty ratio of 100% and thus sets the AC output value to 10 kV. In this case, based on the AC output reference signal and the AC output value indicated by the AC output value instruction signal, the AC drive unit 141 drives the AC transformer 142 such that the voltage value of the AC voltage generated by the AC transformer 142 becomes equal to a voltage value of a waveform illustrated in FIG. 9. Consequently, the AC transformer 142 generates (is caused to generate) the AC voltage having the output waveform illustrated in FIG. 9.

Figure 10:
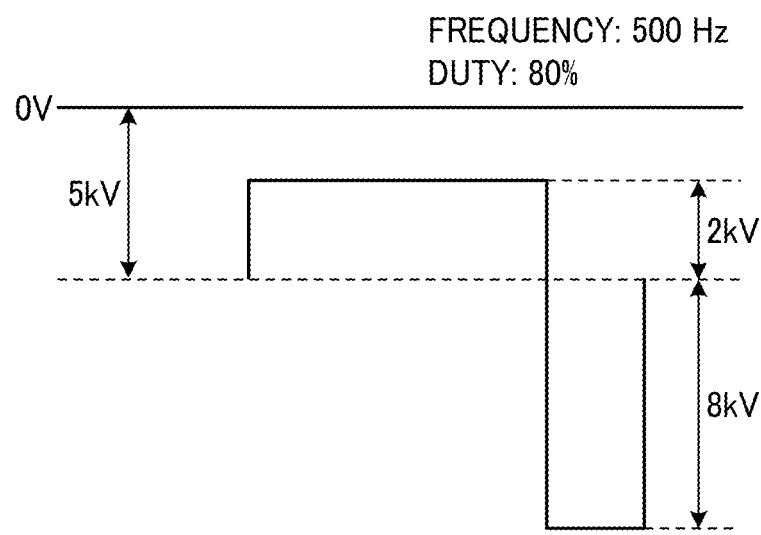
FIG. 10 is a diagram illustrating an example of a superimposed voltage according to the first embodiment.

Thus, the voltage value of the superimposed voltage in which the AC voltage generated by the AC transformer 142 and the DC voltage output by the DC power supply 110 are superimposed becomes equal to a voltage value of a waveform illustrated in FIG. 10.

In the case of the superimposed voltage illustrated in FIG. 10, a negative-polarity maximum voltage is −13 kV (=−5 kV-8 kV) and the voltage of −13 kV is applied to the output side (output terminal) of the AC transformer 142 at the maximum. The absolute value of the withstand voltage on the output side (output terminal) of the AC transformer 142 is 15 kV. Thus, the negative-polarity maximum voltage is set to be smaller than the withstand voltage on the output side (output terminal) of the AC transformer 142. Consequently, application of a voltage exceeding the withstand voltage to the AC transformer 142 and occurrence of a failure such as a damage of the AC transformer 142 are successfully avoided. In the case of the superimposed voltage illustrated in FIG. 10, since the voltage of −3 kV to −13 kV is applied to the secondary-transfer-unit opposing roller 63, a sufficient transfer performance is ensured.

Figure 11:
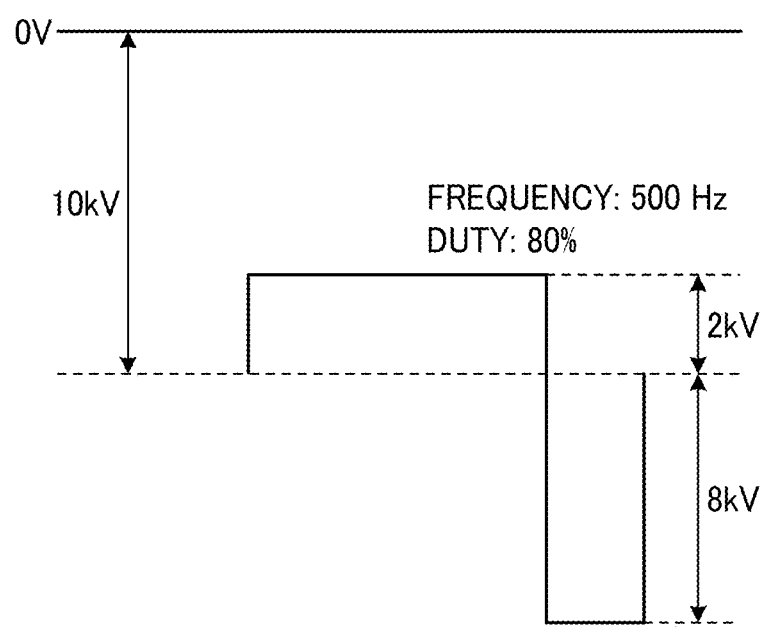
FIG. 11 is a diagram illustrating an example of a superimposed voltage according to a comparative example.

If the first restriction function is not used, that is, if the AC power supply 140 does not output the first restriction signal to the DC power supply 110 and the voltage value of the DC voltage output by the DC power supply 110 is not restricted to −5 kV from −10 kV, the voltage value of the superimposed voltage in which the AC voltage generated by the AC transformer 142 and the DC voltage output by the DC power supply 110 are superimposed becomes equal to a voltage value of a waveform illustrated in FIG. 11.

For example, in the case of the superimposed voltage illustrated in FIG. 11, the negative-polarity maximum voltage is −18 kV (=−10 kV-8 kV) and the voltage of −18 kV is applied to the output side (output terminal) of the AC transformer 142 at the maximum. However, the absolute value of the withstand voltage on the output side (output terminal) of the AC transformer 142 is 15 kV. Thus, the negative-polarity maximum voltage is not set to be smaller than the withstand voltage on the output side (output terminal) of the AC transformer 142. Consequently, application of a voltage exceeding the withstand voltage to the AC transformer 142 and occurrence of a failure such as a damage of the AC transformer 142 are not avoidable.

With such a first restriction function, when a superimposed bias in which an AC voltage of a high-duty output waveform is superimposed on a DC voltage is used to transfer an image onto a recording medium having a small degree of unevenness, the voltage value of the DC voltage is restricted. Thus, the superimposed bias suitable for transfer can be output within the withstand voltage of the AC power supply and a transfer failure can be avoided.

With such a first restriction function, whether or not to restrict the voltage value of the DC voltage is switched in accordance with the duty of the output waveform of the AC voltage. Thus, when an image is transferred onto a recording medium of any kind, the superimposed bias suitable for transfer can be output within the withstand voltage of the AC power supply.

Second Restriction Function

The second restriction function will be described next.

In the case where printing is performed on normal paper and subsequently on uneven paper, output of the AC voltage is started while the DC voltage is being output to output the superimposed voltage. In such a case, simply using the first restriction function alone causes a delay time from when the AC voltage output instruction is started to when restriction of the output of the DC voltage is started by the first restriction function. Thus, the superimposed voltage may exceed the withstand voltage of the AC power supply in this delay time.

The second restriction function performs control for making the absolute value of the AC output value instruction signal stepwise such that the superimposed voltage does not exceed the withstand voltage (an example of a predetermined value) of the AC power supply in a predetermined period from when an instruction to output the AC voltage is started to when restriction of output of the DC voltage is started in a control sequence in which output of the AC voltage is started while the DC voltage is being output to output the superimposed voltage. With the second restriction function, the superimposed voltage is successfully controlled so as not to exceed the withstand voltage of the AC power supply at least in the predetermined period.

Specific description will be given below of an example case where the absolute value of the voltage instructed by the AC output value instruction signal is controlled in two steps, that is, a first instruction value and a second instruction value (where the absolute value of the first instruction value <the absolute value of the second instruction value) in the predetermined period from when the instruction to output the AC voltage is started to when restriction of the output of the DC voltage is started. Note that the absolute value of the voltage instructed by the AC output value instruction signal may be controlled in multiple steps, i.e., three or more steps.

Figure 12:
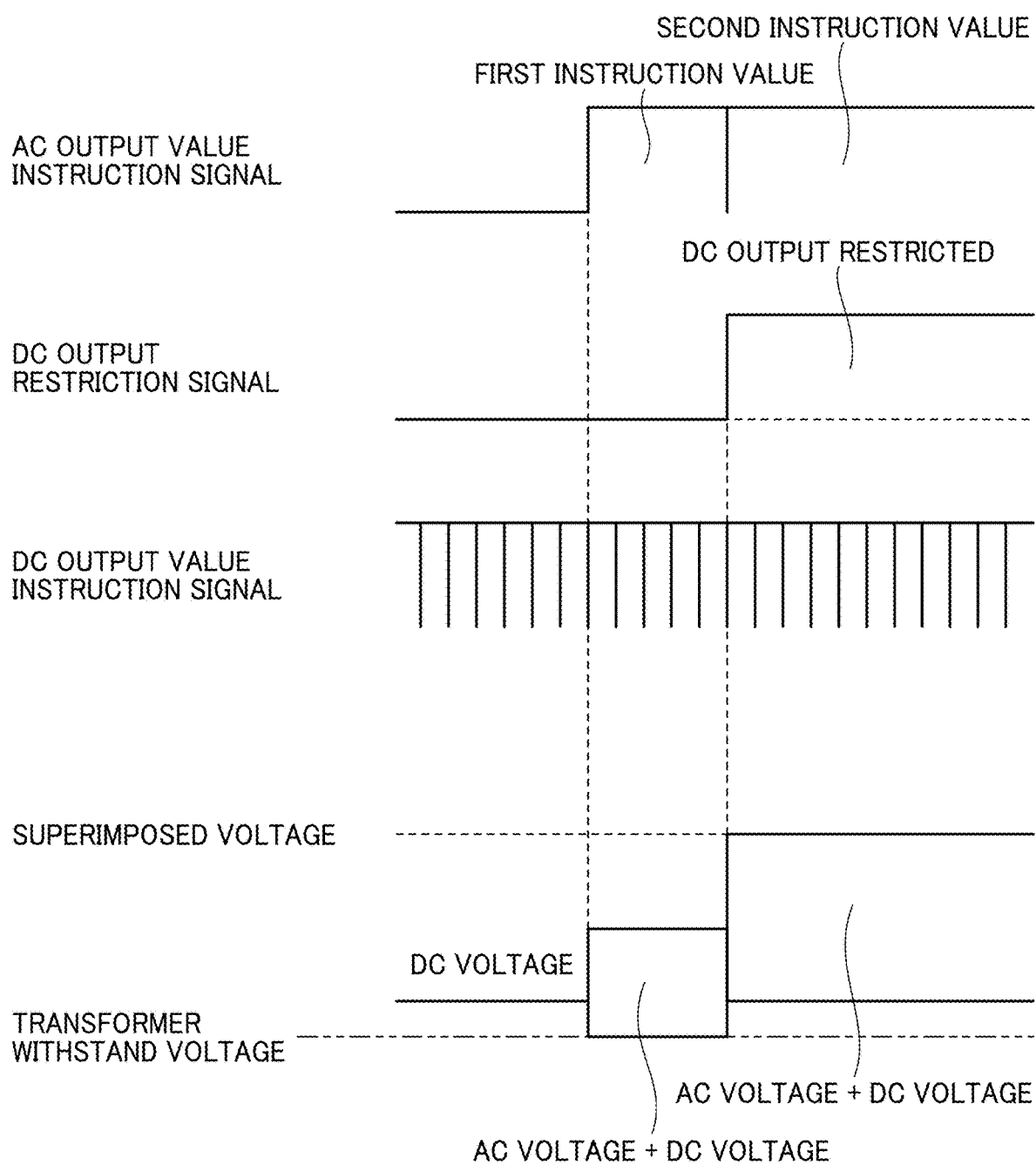
FIG. 12 is a timing chart illustrating an example of a control sequence including a second restriction function according to the first embodiment.

FIG. 12 is a timing chart illustrating an example of a control sequence including the second restriction function. Specifically, FIG. 12 illustrates timings of the AC output value instruction signal output by the power supply control unit 300 to the AC power supply 140, the DC output restriction signal output by the AC power supply 140 to the DC power supply 110, the DC output value instruction signal output by the power supply control unit 300 to the DC power supply 110, and the superimposed voltage output from the AC power supply 140 to a secondary transfer unit (the secondary-transfer-unit opposing roller 63). Note that the withstand voltage (transformer withstand voltage, an example of a predetermined value) of the AC transformer 142 is illustrated in relation to the superimposed voltage.

The power supply control unit 300 periodically outputs the DC output value instruction signal to the DC power supply 110. In FIG. 12, one vertical line denotes one DC output value instruction signal (pulse). Based on the input DC output value instruction signal, the DC drive unit 111 drives the DC transformer 112. Based on the drive signal output from the DC drive unit 111, the DC transformer 112 generates a DC voltage (DC bias).

The power supply control unit 300 starts outputting the AC output value instruction signal having the first instruction value to the AC power supply 140. The power supply control unit 300 outputs the AC output value instruction signal having the first instruction value to the AC power supply 140 at least for a predetermined period (a period to when the AC power supply 140 starts outputting the DC output restriction signal to the DC power supply 110 in the example of FIG. 12).

The first instruction value is a parameter for setting the AC voltage such that the absolute value of the superimposed voltage does not exceed the absolute value of the transformer withstand voltage at least in the predetermined period. That is, through restricting the absolute value of the AC voltage based on the first instruction value, the superimposed voltage is controlled by the power supply control unit 300 so as not to exceed the transformer withstand voltage at least in the predetermined period. In the predetermined period, the AC power supply 140 outputs, to the secondary-transfer-unit opposing roller 63, the superimposed voltage in which the DC voltage based on the DC output value instruction signal and the AC voltage based on the AC output value instruction signal having the first instruction value are superimposed.

The AC power supply 140 starts outputting the DC output restriction signal to the DC power supply 110 after an elapse of the predetermined period since the start of the output of the AC voltage based on the AC output value instruction signal having the first instruction value. After an elapse of at least the predetermined period, the power supply control unit 300 starts outputting the AC output value instruction signal having the second instruction value to the AC power supply 140.

The second instruction value is a parameter for setting the AC voltage such that the absolute value of the superimposed voltage does not exceed the absolute value of the transformer withstand voltage after the predetermined period elapses. That is, through restricting the absolute value of the AC voltage based on the second instruction value, the superimposed voltage is controlled by the power supply control unit 300 so as not to exceed the transformer withstand voltage after the predetermined period. Thus, after the predetermined period elapses, the AC power supply 140 outputs, to the secondary-transfer-unit opposing roller 63, the superimposed voltage that does not exceed the transformer withstand voltage and that is a sum of the AC voltage based on the AC output value instruction signal having the second instruction value and the DC voltage whose value is restricted by the first restriction function.

As described above, the printing apparatus 1 including the power supply device 100 according to the present embodiment includes the DC power supply 110, the AC power supply 140, and the power supply control unit 300. The DC power supply 110 generates a DC voltage of a variable value. The AC power supply 140 generates an AC voltage of a variable value, superimposes the generated AC voltage and the DC voltage output from the DC power supply 110 to generate a superimposed voltage, and outputs the superimposed voltage. The power supply control unit 300 serves as a control circuit that controls the AC power supply 140 and the DC power supply 110. In a control sequence in which the power supply control unit 300 starts giving the DC power supply 110 an instruction to output a DC voltage and subsequently starts giving the AC power supply 140 an instruction to output an AC voltage, the DC power supply 110 restricts output of the DC voltage in accordance with the AC voltage generated by the AC power supply 140. The power supply control unit 300 controls the absolute value of the superimposed voltage to be smaller than or equal to a predetermined value in a predetermined period from when the giving of the instruction to output the AC voltage for the AC power supply 140 is started to when the restricting of the output of the DC voltage is started.

Accordingly, in the case of using the control sequence in which outputting of the DC voltage is started and subsequently the AC voltage is output to output the superimposed voltage serving as a transfer bias, the AC voltage is set in multiple steps, so that the absolute value of the superimposed voltage is successfully controlled to be smaller than or equal to the transformer withstand voltage in the predetermined period from when output of the AC voltage is started to when restriction of the DC voltage is started. After an elapse of the predetermined period, the output DC voltage is restricted in accordance with the AC voltage generated by the AC power supply 140 to set the AC voltage to a target voltage to make the superimposed voltage within a range not exceeding the transformer withstand voltage. As a result, in the control sequence in which the DC voltage is output and subsequently the AC voltage is output, the superimposed voltage suitable for the application is successfully output in accordance with a state of a recording medium within the transformer withstand voltage.

Figure 13:
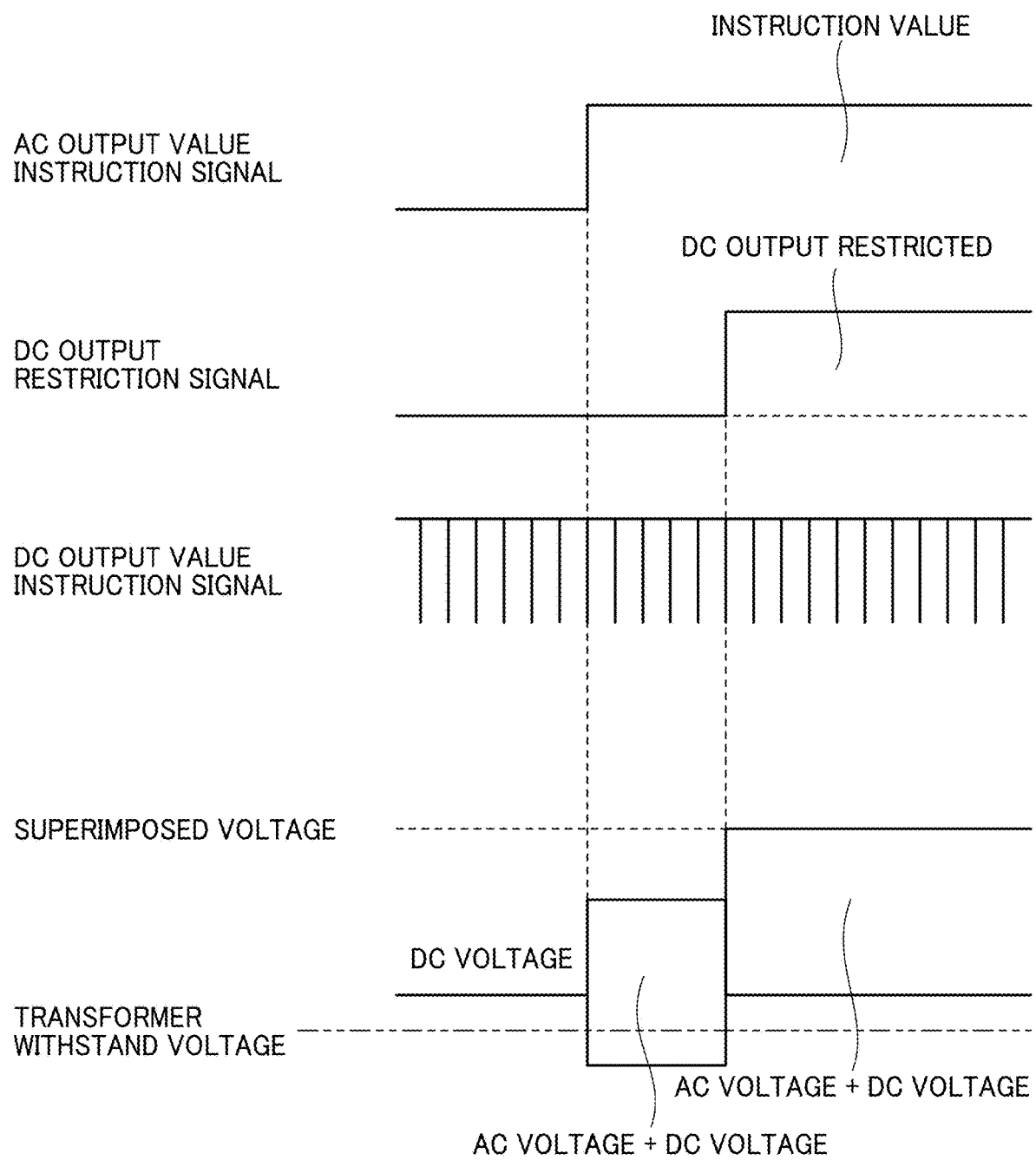
FIG. 13 is a timing chart illustrating an example of a control sequence according to a comparative example.

FIG. 13 is a timing chart illustrating an example of a control sequence of a superimposed voltage according to a comparative example. The control sequence of the superimposed voltage according to the comparative example includes the first restriction function alone. That is, after an elapse of the predetermined period from when the power supply control unit 300 starts outputting the AC output value instruction signal having, for example, the second instruction value to the AC power supply 140, restriction of the output of the DV voltage alone is performed based on the DC output restriction signal in accordance with the first restriction function. In such a configuration, the absolute value of the superimposed voltage may exceed the transformer withstand voltage in the predetermined period and the power supply device may fail. In contrast, the power supply device 100 according to the present embodiment successfully handles this issue.

First Variation

The printing apparatus 1 including a power supply device according to a first variation will be described. The power supply device according to the first variation outputs the AC output value instruction signal having the first instruction value set to "PWM 5%" in a delay time (predetermined period) from when the DC power supply 110 starts outputting the DC voltage to when the DC power supply 110 starts restricting the DC voltage.

Figure 14:
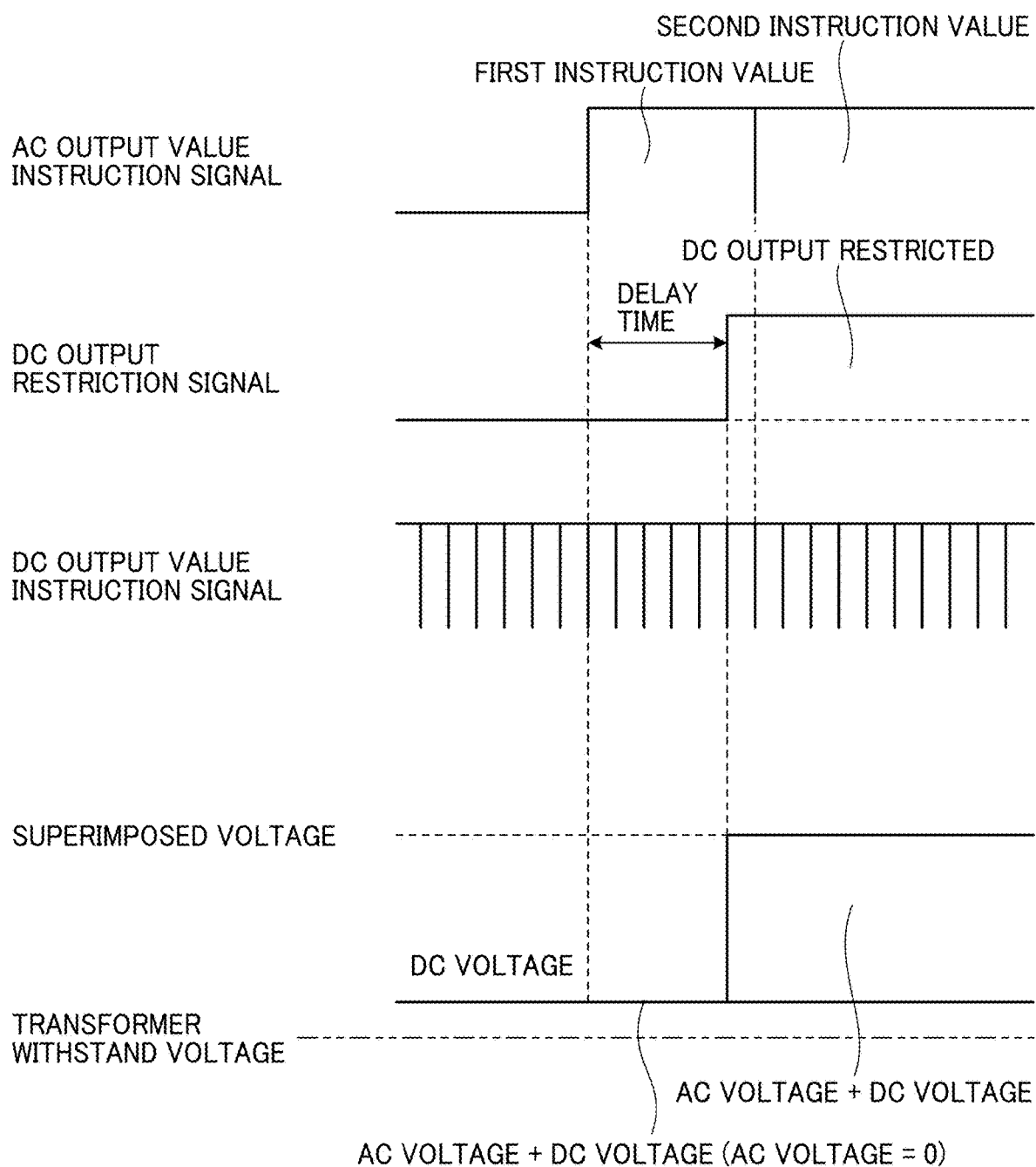
FIG. 14 is a timing chart illustrating an example of a control sequence including a second restriction function according to a first variation.

FIG. 14 is a timing chart illustrating an example of a control sequence including the second restriction function according to the first variation. The AC output value instruction signal illustrated in FIG. 14 has the first instruction value set to "PWM 5%".

In this case, the value of the AC voltage is equal to 0 V as illustrated in FIG. 8. However, the AC output value is input to the AC power supply 140 from the power supply control unit 300. Thus, the AC power supply 140 successfully sets the AC voltage to zero in the delay time (predetermined period) from when the input of the AC output value is started and successfully sets the DC output restriction signal active and generate the AC voltage based on the second instruction value after an elapse of the delay time (predetermined period).

Note that the period in which "PWM 5%" is set as the first instruction value may be set longer than or equal to the delay time (predetermined period) from w % ben the DC power supply 110 starts outputting the DC voltage to when the DC power supply 110 starts restricting the voltage. This configuration can decrease a time taken to switch the target DC voltage to the target superimposed voltage.

Second Embodiment

The printing apparatus 1 including a power supply device according to a second embodiment will be described. Constant current control is often performed for a secondary transfer DC output. In such a case, a value of a DC voltage immediately before the DC voltage is output to the AC power supply 140 is desirably grasped. The power supply device according to the second embodiment detects the value of the DC voltage immediately before the DC voltage is input to the AC power supply 140, and sets a first instruction value of an AC output value instruction signal based on the detected value of the DC voltage and a value of a transformer withstand voltage. For example, the power supply device subtracts the "detected value of the DC voltage immediately before the DC voltage is input to the AC power supply 140" from the "value of the transformer withstand voltage" to set the first instruction value of the AC output value instruction signal.

Figure 15:
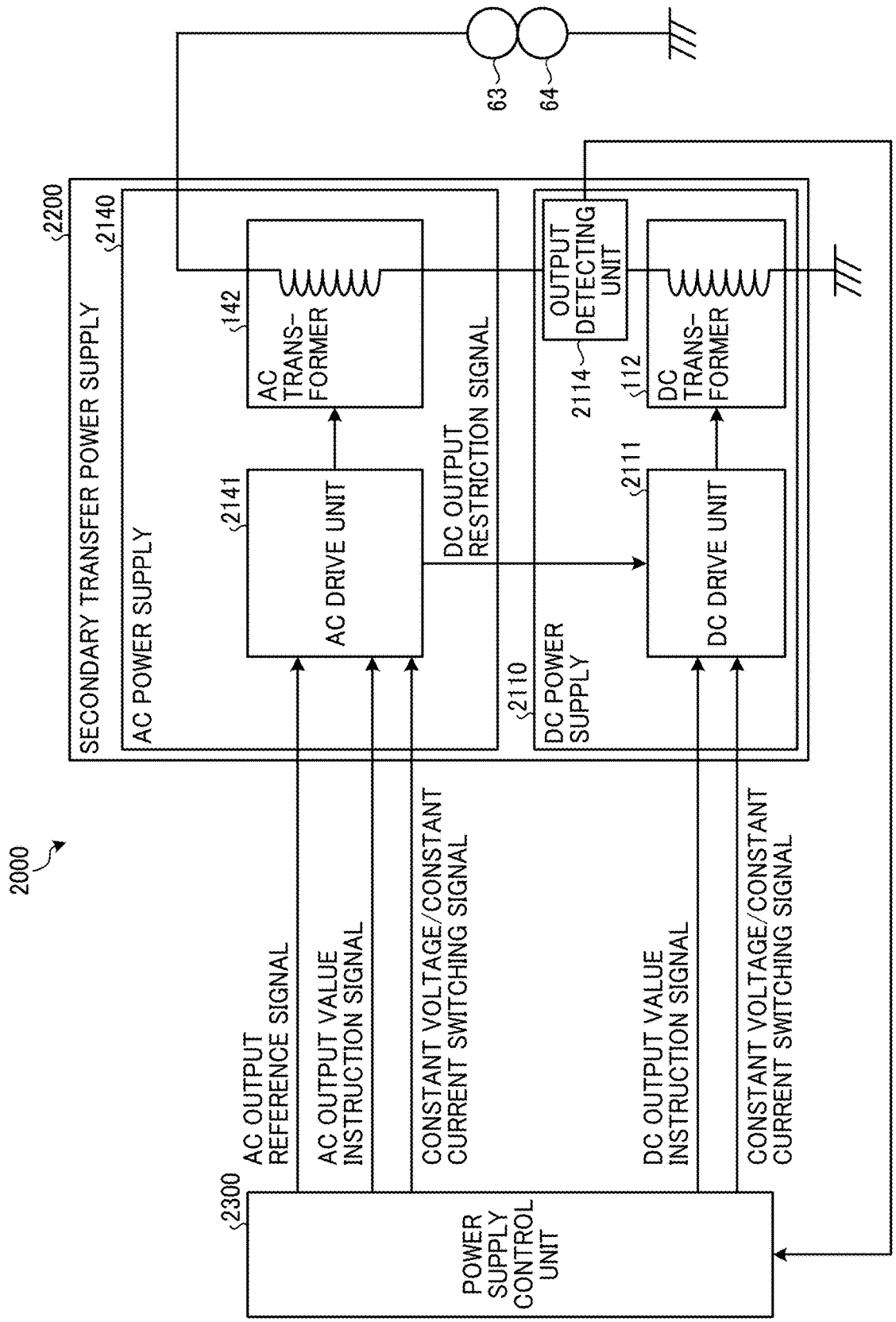
FIG. 15 is a block diagram illustrating an example of a configuration of a power supply device of a printing apparatus according to a second embodiment.

FIG. 15 is a block diagram illustrating an example of a configuration of a power supply device 2000 of the printing apparatus 1 according to the second embodiment. As illustrated in FIG. 15, the power supply device 2000 of the printing apparatus 1 according to the second embodiment additionally includes an output detecting unit 2114 in a DC power supply 2110 of a secondary transfer power supply 2200. In FIG. 15, similarly to the AC drive unit 141 illustrated in FIG. 3, an AC drive unit 2141 includes the AC drive circuit 141*a* and the determination circuit 141*b*. In FIG. 15, similarly to the DC drive unit 111 illustrated in FIG. 3, a DC drive unit 2111 includes the DC drive circuit 111*a* and the restriction circuit 111*b*.

The output detecting unit 2114 detects the DC voltage output from the DC transformer 112 (that is, the DC voltage immediately before being input to the AC power supply 140), and outputs the detected value of the DC voltage to a power supply control unit 2300. Specific examples of the output detecting unit 2114 include a detection circuit that detects at least a voltage. The output detecting unit 2114 outputs the detected voltage value to the power supply control unit 2300.

Based on the voltage value detected the output detecting unit 2114 and the transformer withstand voltage, the power supply control unit 2300 performs feedback control on the first instruction value such that the superimposed voltage does not exceed the transformer withstand voltage in a delay time (predetermined period) from when an instruction to output the DC voltage is started to when restriction of the DC voltage is started by the DC power supply 110.

In the case of constant current control, the output detecting unit 2114 detects a DC current output from the DC transformer 112 and outputs the detected value of the DC current to the power supply control unit 2300. Examples of the output detecting unit 2114 include a detection circuit that detects at least a current. The power supply control unit 2300 adjusts the second DC output value indicated by the DC output value instruction signal, based on the current value detected by the output detecting unit 2114, and outputs the DC output value instruction signal to the DC power supply 2110.

The load resistance or capacity of the secondary transfer member may change in accordance with a temperature or humidity or over time. Thus, the DC voltage may differ from the set value. Even in such a case, the power supply device 2000 according to the second embodiment successfully controls the superimposed voltage to be a suitable value according to a recording medium subjected printing in a range not exceeding the transformer withstand voltage in the predetermined period from when output of the DC voltage is started to when restriction of the DC voltage is started in the case where output of the DC voltage is started and subsequently the high AC voltage is output to output the superimposed voltage serving as the transfer bias.

Second Variation

The value of the DC voltage restricted by the DC output restriction signal is not necessarily restricted based on the transformer withstand voltage alone. For example, a value set for avoiding leakage of the superimposed voltage in the printing apparatus 1 may be a restriction factor. A withstand voltage of an electronic component (such as a capacitor or resistor) inside the AC transformer 142 may be a restriction factor. The value of the DC voltage restricted by the DC output restriction signal can be set in any manner in accordance with these restriction factors.

Third Variation

In each of the embodiments and variations described above, the example case has been described where the power supply device 100 (or 2000) of the printing apparatus 1 includes three component substrates for the power supply control unit 300, the DC power supply 110, and the AC power supply 140 (or the power supply control unit 2300, the DC power supply 2110, and an AC power supply 2140). However, the number of component substrates is not limited. That is, distribution of circuit blocks may be determined in accordance with arrangement in the power supply device 100 (or 2000) of the printing apparatus 1.

Fourth Variation

In the power supply device according to each of the embodiments and variations described above, both the secondary transfer DC output and AC output are not limited to either constant current control or constant voltage control. The power supply device according to each of the embodiments and variations described above is applicable to "charging AC output/DC output" or "developing AC output/DC output" in addition to "secondary transfer DC output/AC output".

Third Embodiment

A third embodiment relates to an example of performing, in an interval between preceding paper that is a preceding recording medium and following paper that is a following recording medium in accordance with kinds of the preceding paper and the following paper, control for outputting, as a bias, a superimposed voltage at which a sum of a DC voltage and an AC voltage is smaller than or equal to a predetermined value for a restriction period to when restricting of the output of the DC voltage performed by the DC power supply functions, and subsequently switching control for outputting, as the bias, the superimposed voltage for the following paper. In the description below, the description of the components that are the same or substantially the same as those of the embodiments described above is omitted.

In the secondary transfer step, an electrophotographic apparatus superimposes the AC voltage on the DC voltage to generate a transfer bias, and ensures, with the transfer bias, the transfer performance for various kinds of sheets. The superimposed voltage of the DC voltage and the AC voltage is applied to the output side of an AC transformer, so that the superimposed voltage may exceed the withstand voltage of the AC transformer. Thus, a technique for restricting the maximum value of the DC voltage when the AC voltage is output is present.

For example, a restricted value of a DC voltage transfer bias is changed in accordance with the waveform of an AC voltage transfer bias, so that the transfer performance is ensured for sheets (that is, a high bias value is output within an allowed range) while keeping the superimposed voltage within the transformer withstand voltage.

That is, when non-uneven paper is used, the AC voltage transfer bias is set to have a waveform of a high duty ratio to make the restricted value of the DC voltage transfer bias small, so that an insufficient transfer is avoided while keeping the transfer bias within the transformer withstand voltage. When uneven paper is used, the AC voltage transfer bias is set to have a waveform of a low duty ratio to make the restricted value of the DC voltage transfer bias large, so that a transfer performance is ensured for the paper while keeping the transfer bias within the transformer withstand voltage.

A control signal for the AC voltage transfer bias is set on to generate a restriction signal of the DC voltage transfer bias. Thus, if the DC voltage transfer bias is output and subsequently the AC voltage transfer bias is output, a period in which the transfer bias exceeds the withstand voltage of the AC transformer may occur in a period immediately from when the AC voltage transfer bias is output to when the restriction signal of the DC voltage transfer bias is generated. When the way of applying the transfer bias is changed in the control sequence in which the AC voltage is output and subsequently the DC voltage is output, output of the superimposed voltage is temporarily set off and is subsequently set to the target level again, which takes time to start the subsequent printing, which takes time to start the subsequent printing.

Accordingly, in the present embodiment, in an interval between the preceding paper and the following paper, in accordance with kinds of the preceding paper and the following paper, the power supply control unit 300 performs control for outputting, as the bias, the superimposed voltage at which the sum of the DC voltage and the AC voltage is smaller than or equal to a predetermined value for a restriction period to when restriction of the output of the DC voltage performed by the DC power supply 110 functions, and subsequently performs switching control for outputting, as the bias, the superimposed voltage for the following sheet. Thus, the switching control for outputting, as the bias, the superimposed voltage for the following paper is successfully performed while keeping the output of the superimposed voltage on. This omits control for setting the superimposed voltage to the target level again and therefore reduces the time to start the subsequent printing.

The power supply control unit 300 sets the restriction period to be shorter than a period equivalent to the interval between the preceding paper and the following paper. This enables the AC voltage to be set to 0 V in the period equivalent to the interval and thus can ensure the productivity of printing.

In printing on a leading recording medium (that is, when information on the preceding paper is absent), the power supply control unit 300 performs control for outputting, as the bias, the superimposed voltage at which the sum of the DC voltage and the AC voltage is smaller than or equal to the predetermined value for the restriction period, and subsequently performs switching control for outputting, as the bias, the superimposed voltage for the leading recording medium in accordance with the kind of the reading recording medium.

When information on the following paper is absent, the power supply control unit 300 performs switching control for outputting, as the bias, the superimposed voltage that is a sum of the DC voltage and the AC voltage of 0 V after an adjusting pattern for the interval passes by the secondary-transfer-unit opposing roller 63. Since a scan sensor for the adjusting pattern for the interval is located on secondary transfer side, the power supply control unit 300 performs switching control to output, as the bias, the superimposed voltage after the adjusting pattern for the interval passes by the secondary-transfer-unit opposing roller 63. Thus, the same superimposed bias as that for the preceding paper is output for the adjusting pattern for the interval to implement the same transfer condition as that for scanning in continuous printing performed up to the previous page, so that an influence on the scan result can be avoided.

If the DC voltage is being output for the preceding paper, the power supply control unit 300 performs switching control for outputting, as the bias, the superimposed voltage that is a sum of the DC voltage and the AC voltage of 0 V in the interval. That is, in switching control from printing in which the DC voltage is output, the AC voltage of 0 V is output in the interval irrespective of the following paper.

If the superimposed voltage that is a sum of the DC voltage and the AC voltage of a low duty ratio is being output as the bias for the preceding paper, the power supply control unit 300 performs switching control for outputting, as the bias, the superimposed voltage that is a sum of the DC voltage and the AC voltage of 0 V in the interval. That is, in switching control from printing based on the superimposed voltage that is the sum of the DC voltage and the AC voltage of the low duty ratio, the AC voltage of 0 V is output in the interval irrespective of the following paper.

If the AC voltage of a high duty ratio is output for the preceding paper and the DC voltage is to be output for the following paper, the power supply control unit 300 continuously uses the AC voltage of the high duty ratio in the interval. If the AC voltage of the high duty ratio is output for the preceding paper and is to be output for the following paper, the power supply control unit 300 continuously uses the AC voltage of the high duty ratio in the interval. Consequently, the transfer performance can be ensured for the adjusting pattern such as a pattern between papers in the interval in which the AC voltage of 0 V does not have to be output.

If a bias pattern of the superimposed voltage output for the following paper differs from a bias pattern of the superimposed voltage output for the preceding paper, the power supply control unit 300 performs switching control of the superimposed voltage in the interval. That is, the power supply control unit 300 performs control for outputting the AC voltage of 0 V in the interval when the kind of the following paper changes from the kind of the preceding paper.

FIG. 16 is a table for describing an example of transfer bias switching control performed by the printing apparatus 1 according to the third embodiment during continuous printing. During continuous printing, the CPU 340 included in the power supply control unit 300 illustrated in FIG. 4 operates the I/O controller 310 to perform transfer bias (superimposed bias) switching control for the secondary-transfer-unit opposing roller 63. As described above, the AC drive unit 141 performs control while switching, in accordance with the degrees of unevenness of sheets, the control pattern between three patterns, i.e., control based on an output waveform of a high duty ratio (for example, an output waveform of a duty ratio of 80%), control based on an output waveform of a low duty ratio (for example, an output waveform of a duty ratio of 20%), and control based on output of a DC voltage alone without output of an AC voltage. In the description below, the transfer bias including the DC voltage alone is referred to as "DC". The transfer bias that is the sum of the DC voltage and the AC voltage of the high duty ratio is referred to as "high duty AC". The transfer bias that is the sum of the DC voltage and the AC voltage of the low duty ratio is referred to as "low duty AC".

FIG. 17 is a table for describing an example of transfer bias switching control performed by the printing apparatus 1 according to the third embodiment in an interval between papers when information on the following paper is acquirable. A description will be given of the transfer bias switching control in the case where printing is continuously performed on a plurality of papers (an example of recording media) having different degrees of unevenness. In the description, the setting of the transfer bias for the paper currently subjected to transfer is referred to as the transfer bias for the preceding paper, the setting of the transfer bias for the sheet to be subjected to transfer next is referred to as the transfer bias for the following paper, and an interval between the preceding paper and the following paper is referred to as the interval.

The AC high voltage output having a first level among multiple levels is output in the interval, and the AC voltage is set to a second target level at a timing for the following paper. In the present embodiment, the AC voltage of 0 V is used in the interval. Thus, in the description below, the AC output having the first level used in the interval is referred to as "DC (DC voltage)+AC (AC voltage of 0 V)" or "AC voltage of 0 V". In accordance with the table of FIG. 17, the power supply control unit 300 determines the transfer bias of the first level output in the interval, based on a combination of the preceding paper and the following paper.

For a portion enclosed by a thick frame in FIG. 17, AC (AC voltage) of 0V is not output in the interval. That is, when high duty AC is used for the preceding paper and DC (DC voltage) is used for the following paper, the high duty AC is continuously used in the interval. This is because, in the case of switching that does involve the switching time (such as switching from high duty AC to DC), it is sufficient to switch the transfer bias at the start for the following paper, and the use of the high duty AC transfer bias that implements a high transfer performance for a pattern between papers by performing such switching is desired in the interval during printing. Due to the same reason, when high duty AC is used for the preceding paper and the following paper, the high duty AC is continuously used in the interval.

FIG. 18 is a table for describing an example of switching of the transfer bias performed by the printing apparatus 1 according to the third embodiment. Specifically, FIG. 18 is a table for describing a combination for which whether to add 0 V AC is determined in accordance the following paper in printing on the leading paper. Since the preceding paper is absent in printing on the leading paper, whether to add 0 V AC is determined in accordance the following paper. Before the leading paper passes by the secondary-transfer-unit opposing roller 63, DC, high duty AC, or DC+AC (AC voltage of 0 V) is output in advance in a region without an image (referred to as a non-image region). That is, the power supply control unit 300 determines the transfer bias used in the interval in accordance with the table illustrated in FIG. 18.

FIG. 19 is a table for describing an example of settings of the transfer bias used in the printing apparatus 1 according to the third embodiment. Specifically, FIG. 19 is a table illustrating an example of a combination of the setting of the transfer bias used in the interval in accordance with the preceding paper in printing on the last paper.

Since information on the kind of the following paper is absent for the last paper, the power supply control unit 300 performs the following control. When the information on the following paper is not acquirable or in the case of the last paper, the power supply control unit 300 determines the transfer bias used in the interval in accordance with the table illustrated in FIG. 19. A description is given of control for switching the transfer bias to DC+AC (AC voltage of 0 V) after the pattern between papers passes by the secondary-transfer-unit opposing roller 63 when the information on the kind of the following paper is absent during printing with high duty AC.

The power supply control unit 300 cannot determine whether the following paper is the last paper where the job ends or the interval is extended due to an adjustment operation or the like. However, to protect the high-voltage substrates, AC (AC voltage) of 0 V is desirably added even if the information on the following paper is absent. To avoid the transfer bias (high duty AC) used in the interval being different from the setting of the transfer bias used in the intervals during continuous printing described above, multi-level control for adding high duty AC first and, after the pattern between papers passes by the secondary-transfer-unit opposing roller 63, adding the AC voltage of 0 V is performed.

As described above, the printing apparatus 1 according to the third embodiment can perform switching control for outputting, as the bias, the superimposed voltage for the following paper while keeping the output of the superimposed voltage on, and thus omit control for setting the superimposed voltage to the target level again and reduce the time to start the subsequent printing.

According to a first aspect, a power supply device includes a DC power supply, an AC power supply, and a control circuit. The DC power supply generates a DC voltage of a variable value. The AC power supply generates an AC voltage of a variable value, superimposes the generated AC voltage and the DC voltage output from the DC power supply to generate a superimposed voltage, and outputs the superimposed voltage. The control circuit controls the AC power supply and the DC power supply. In a control sequence in which the control circuit starts giving the DC power supply an instruction to output the DC voltage and subsequently starts giving the AC power supply an instruction to output the AC voltage, the DC power supply restricts output of the DC voltage in accordance with the AC voltage generated by the AC power supply, and the control circuit controls an absolute value of the superimposed voltage to be smaller than or equal to a predetermined value in a predetermined period from when the giving of the instruction to output the AC voltage for the AC power supply is started to when the restricting of the output of the DC voltage is started.

According to a second aspect, in the power supply device of the first aspect, the control circuit controls an absolute value of the AC voltage generated by the AC power supply to increase while controlling the absolute value of the superimposed voltage to be smaller than or equal to the predetermined value, after the restricting of the output of the DC voltage is started by the DC power supply.

According to a third aspect, in the power supply device of the first or second aspect, the control circuit controls an absolute value of the AC voltage generated by the AC power supply to increase stepwise toward a set value in at least the predetermined period, and controls the absolute value of the AC voltage generated by the AC power supply to be equal to the set value after the restricting of the output of the DC voltage is started by the DC power supply.

According to a fourth aspect, in the power supply device of the third aspect, the control circuit outputs a signal that instructs the AC power supply to generate the AC voltage in the predetermined period, and the AC power supply sets the AC voltage to zero in the predetermined period, and sets the AC voltage to the set value after the restricting of the output of the DC voltage is started by the DC power supply.

According to a fifth aspect, the power supply device of any one of the first to fourth aspects further includes a detection circuit. The detection circuit detects an absolute value of the DC voltage output by the DC power supply. The control circuit controls, in accordance with the detected absolute value of the DC voltage, the AC voltage generated by the AC power supply to make the absolute value of the superimposed voltage be smaller than or equal to the predetermined value in the predetermined period.

According to a sixth aspect, an image forming apparatus includes the power supply device of any one of the first to fifth aspects, and a transfer device. The transfer device transfers an image onto a recording medium in accordance with the superimposed voltage output from the AC power supply.

According to a seventh aspect, in the image forming apparatus of the sixth aspect, in an interval between preceding paper that is a preceding recording medium and following paper that is a following recording medium, in accordance with kinds of the preceding paper and the following paper, the control circuit performs control for outputting, as a bias, the superimposed voltage at which a sum of the DC voltage and the AC voltage is smaller than or equal to the predetermined value for a restriction period to when the restricting of the output of the DC voltage performed by the DC power supply functions, and subsequently performs switching control for outputting, as the bias, the superimposed voltage for the following paper.

According to an eighth aspect, in the image forming apparatus of the seventh aspect, the control circuit sets the restriction period to be shorter than a period equivalent to the interval.

According to a ninth aspect, in the image forming apparatus of the seventh aspect, in printing on a leading recording medium, in accordance with a kind of the leading recording medium, the control circuit performs control for outputting, as the bias, the superimposed voltage at which the sum of the DC voltage and the AC voltage is smaller than or equal to the predetermined value for the restriction period, and subsequently performs switching control for outputting, as the bias, the superimposed voltage for the leading recording medium.

According to a tenth aspect, in the image forming apparatus of the seventh aspect, in a case where information on the following paper is absent, the control circuit performs switching control for outputting, as the bias, the superimposed voltage that is a sum of the DC voltage and the AC voltage of 0 V after an adjusting pattern for the interval passes by the transfer device.

According to an eleventh aspect, in the image forming apparatus of the seventh aspect, in a case where the DC voltage is being output for the preceding paper, the control circuit performs switching control for outputting, as the bias, the superimposed voltage that is a sum of the DC voltage and the AC voltage of 0 V in the interval.

According to a twelfth aspect, in the image forming apparatus of the seventh aspect, in a case where the superimposed voltage that is a sum of the DC voltage and the AC voltage of a low duty ratio is being output as the bias for the preceding paper, the control circuit performs switching control for outputting, as the bias, the superimposed voltage that is a sum of the DC voltage and the AC voltage of 0 V in the interval.

According to a thirteenth aspect, in the image forming apparatus of the seventh aspect, in a case where the AC voltage of a high duty ratio is output for the preceding paper and the DC voltage is to be output for the following paper, the control circuit continuously uses the AC voltage of the high duty ratio in the interval, and in a case where the AC voltage of the high duty ratio is output for the preceding paper and is to be output for the following paper, the control circuit continuously uses the AC voltage of the high duty ratio in the interval.

According to a fourteenth aspect, in the image forming apparatus of the seventh aspect, the control circuit performs switching control of the superimposed voltage in the interval in a case where a bias pattern of the superimposed voltage output for the following paper differs from a bias pattern of the superimposed voltage output for the preceding paper.

According to a fifteenth aspect, a program causes a computer that controls an image forming apparatus to function as a control unit. The image forming apparatus includes a DC power supply, an AC power supply, and a transfer device. The DC power supply generates a DC voltage of a variable value. The AC power supply generates an AC voltage of a variable value, superimposes the AC voltage and the DC voltage output from the DC power supply to generate a superimposed voltage, and outputs the superimposed voltage. The transfer device transfers an image onto a recording medium in accordance with the superimposed voltage. The control unit controls the AC power supply and the DC power supply. In a control sequence in which the control unit starts giving the DC power supply an instruction to output the DC voltage and subsequently starts giving the AC power supply an instruction to output the AC voltage, the DC power supply restricts output of the DC voltage in accordance with the AC voltage generated by the AC power supply, and the control unit controls an absolute value of the superimposed voltage to be smaller than or equal to a predetermined value in a predetermined period from when the giving of the instruction to output the AC voltage for the AC power supply is started to when the restricting of the output of the DC voltage is started. In an interval between preceding paper that is a preceding recording medium and following paper that is a following recording medium, in accordance with kinds of the preceding paper and the following paper, the control unit performs control for outputting, as a bias, the superimposed voltage at which a sum of the DC voltage and the AC voltage is smaller than or equal to the predetermined value for a restriction period to when the restricting of the output of the DC voltage performed by the DC power supply functions, and subsequently performs switching control for outputting, as the bias, the superimposed voltage for the following paper.

According to the one or more embodiments described above, in the control sequence in which the DC voltage is output and subsequently the AC voltage is output, the superimposed voltage suitable for the application can be output.

The programs executed by the printing apparatus 1 in the one or more embodiments described above are preinstalled in the ROM 330 or the like and provided. The programs executed by the printing apparatus 1 in the one or more embodiments described above may be recorded as a file of an installable format or executable format on a computer-readable recording medium such as a compact disc read-only memory (CR-ROM), a flexible disk (FD), a compact disc recordable (CD-R), or a digital versatile disc (DVD) and provided.

The programs executed by the printing apparatus 1 according to the one or more embodiments described above may be stored on a computer connected to a network such as the Internet and may be downloaded via the network and provided to the printing apparatus 1. The programs executed by the printing apparatus 1 according to the one or more embodiments may be provided or distributed via a network such as the Internet.

The programs executed by the printing apparatus 1 according to the one or more embodiments described above have a module configuration including the functional units implemented by the power supply control unit 300. The CPU 340 (an example of a processor) or the like, which is actual hardware, reads the programs from the ROM 330 and executes the programs, so that the functional units described above are loaded to a main storage device and are generated in the main storage device.

In the one or more embodiments described above, an example of the image forming apparatus according to the embodiments of the present disclosure that is applied to an MFP having at least two functions among a copy function, a print function, a scanner function, and a facsimile function has been described. However, the image forming apparatus according to the embodiments of the present disclosure is applicable to any image forming apparatus such as a copier, a printer, a scanner, or a facsimile machine.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus, comprising:
a power supply device including:
a DC power supply configured to generate a DC voltage of a variable value and output the DC voltage;
an AC power supply configured to generate an AC voltage of a variable value, superimpose the AC voltage and the DC voltage output from the DC power supply to generate a superimposed voltage, and output the superimposed voltage; and
a control circuit configured to control the AC power supply and the DC power supply, wherein
the control circuit is configured to:
start giving the DC power supply an instruction to output the DC voltage, and
start giving the AC power supply an instruction to output the AC voltage,
the DC power supply is configured to restrict output of the DC voltage in accordance with the AC voltage generated by the AC power supply, and
the control circuit is configured to control an absolute value of the superimposed voltage to be smaller than or equal to a predetermined value in a predetermined period from a time when the giving of the instruction to output the AC voltage is started to a time when the restricting of the output of the DC voltage is started;
a transfer device configured to transfer an image onto a recording medium in accordance with the superimposed voltage output from the AC power supply,
wherein:
the recording medium is one of a plurality of recording media including a preceding recording medium and a following recording medium, and
the control circuit is configured to, in an interval between preceding paper that is the preceding recording medium and following paper that is the following recording medium, in accordance with kinds of the preceding paper and the following paper,
perform control for outputting, as a bias, the superimposed voltage at which a sum of the DC voltage and the AC voltage is smaller than or equal to the predetermined value for a restriction period to when the restricting of the output of the DC voltage performed by the DC power supply functions, and
subsequently perform switching control for outputting, as the bias, the superimposed voltage for the following paper.

2. The image forming apparatus according to claim 1, wherein the control circuit is configured to control an absolute value of the AC voltage generated by the AC power supply to increase while controlling the absolute value of the superimposed voltage to be smaller than or equal to the predetermined value, after the restricting of the output of the DC voltage is started by the DC power supply.

3. The image forming apparatus according to claim 1, wherein the control circuit is configured to:
control an absolute value of the AC voltage generated by the AC power supply to increase stepwise toward a set value in at least the predetermined period, and
control the absolute value of the AC voltage generated by the AC power supply to be equal to the set value after the restricting of the output of the DC voltage is started by the DC power supply.

4. The image forming apparatus according to claim 3, wherein:
the control circuit is configured to output a signal that instructs the AC power supply to generate the AC voltage in the predetermined period, and
the AC power supply is configured to:
set the AC voltage to zero in the predetermined period, and
set the AC voltage to the set value after the restricting of the output of the DC voltage is started by the DC power supply.

5. The image forming apparatus according to claim 1, further comprising:
a detection circuit configured to detect an absolute value of the DC voltage output by the DC power supply, wherein
the control circuit is configured to control, in accordance with the detected absolute value of the DC voltage, the AC voltage generated by the AC power supply to make the absolute value of the superimposed voltage be smaller than or equal to the predetermined value in the predetermined period.

6. The image forming apparatus according to claim 1, wherein the control circuit is configured to set the restriction period to be shorter than a period equivalent to the interval.

7. The image forming apparatus according to claim 1, wherein
the plurality of recording media include a leading recording medium, and
the control circuit is configured to, in printing on the leading recording medium, in accordance with a kind of the leading recording medium, perform control for outputting, as the bias, the superimposed voltage at which the sum of the DC voltage and the AC voltage is smaller than or equal to the predetermined value for the restriction period, and subsequently perform switching control for outputting, as the bias, the superimposed voltage for the leading recording medium.

8. The image forming apparatus according to claim 1, wherein the control circuit is configured to, in a case where information on the following paper is absent, perform switching control for outputting, as the bias, the superimposed voltage that is a sum of the DC voltage and the AC voltage of 0 V after an adjusting pattern for the interval passes by the transfer device.

9. The image forming apparatus according to claim 1, wherein the control circuit is configured to, in a case where the DC voltage is being output for the preceding paper, perform switching control for outputting, as the bias, the superimposed voltage that is a sum of the DC voltage and the AC voltage of 0 V in the interval.

10. The image forming apparatus according to claim 1, wherein the control circuit is configured to, in a case where the superimposed voltage that is a sum of the DC voltage and the AC voltage of a low duty ratio is being output as the bias for the preceding paper, perform switching control for outputting, as the bias, the superimposed voltage that is a sum of the DC voltage and the AC voltage of 0 V in the interval.

11. The image forming apparatus according to claim 1, wherein the control circuit is configured to
in a case where the AC voltage of a high duty ratio is output for the preceding paper and the DC voltage is to be output for the following paper, continuously use the AC voltage of the high duty ratio in the interval, and
in a case where the AC voltage of the high duty ratio is output for the preceding paper and is to be output for the following paper, continuously use the AC voltage of the high duty ratio in the interval.

12. The image forming apparatus according to claim 1, wherein the control circuit is configured to perform switching control of the superimposed voltage in the interval in a case where a bias pattern of the superimposed voltage output for the following paper differs from a bias pattern of the superimposed voltage output for the preceding paper.

13. A non-transitory recording medium storing a plurality of instructions which, when executed by a processor on a power supply device, causes the processor to perform a control sequence,
the power supply device including:
a DC power supply configured to generate a DC voltage of a variable value and output the DC voltage; and
an AC power supply configured to generate an AC voltage of a variable value, superimpose the AC voltage and the DC voltage output from the DC power supply to generate a superimposed voltage, and output the superimposed voltage,
the control sequence comprising:
starting giving the DC power supply an instruction to output the DC voltage;
starting giving the AC power supply an instruction to output the AC voltage; and
restricting output of the DC voltage at the DC power supply in accordance with the AC voltage generated by the AC power supply, wherein
an absolute value of the superimposed voltage is controlled to be smaller than or equal to a predetermined value in a predetermined period from a time when the giving of the instruction to output the AC voltage is started to a time when the restricting of the output of the DC voltage is started,
wherein the power supply device further includes:
a transfer device configured to transfer an image onto a recording medium in accordance with the superimposed voltage,
the recording medium is one of a plurality of recording media including a preceding recording medium and a following recording medium, and
the control sequence further comprises:
in an interval between preceding paper that is the preceding recording medium and following paper that is the following recording medium, in accordance with kinds of the preceding paper and the following paper,
performing control for outputting, as a bias, the superimposed voltage at which a sum of the DC voltage and the AC voltage is smaller than or equal to the predetermined value for a restriction period to when the restricting of the output of the DC voltage performed by the DC power supply functions, and
subsequently performing switching control for outputting, as the bias, the superimposed voltage for the following paper.

* * * * *